(12) United States Patent
Yamada et al.

(10) Patent No.: US 6,290,328 B1
(45) Date of Patent: Sep. 18, 2001

(54) MULTI-PASS BANDED PRINTING

(75) Inventors: Akitoshi Yamada; Hiromitsu Hirabayashi, both of Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/019,181

(22) Filed: Feb. 5, 1998

(51) Int. Cl.⁷ .................................................. B41J 2/21
(52) U.S. Cl. .............................. 347/43; 347/15; 347/41
(58) Field of Search .............................. 347/41, 43, 12, 347/15, 40

(56) References Cited

U.S. PATENT DOCUMENTS

| | | | |
|---|---|---|---|
| 4,748,453 | * 5/1988 | Lin et al. | 347/43 |
| 5,142,374 | 8/1992 | Tajika et al. | 358/298 |
| 5,488,398 | 1/1996 | Matsubara et al. | 347/43 |
| 5,500,661 | 3/1996 | Matsubara et al. | 347/41 |
| 5,583,550 | * 12/1996 | Hickman et al. | 347/41 |
| 5,617,123 | 4/1997 | Takaoka et al. | 347/15 |
| 5,633,663 | 5/1997 | Matsubara et al. | 347/41 |
| 5,692,843 | * 12/1997 | Furuya | 347/43 |
| 5,701,366 | * 12/1997 | Ostromoukhov et al. | 382/237 |
| 5,729,259 | 3/1998 | Gotoh et al. | 347/43 |
| 5,764,254 | * 6/1998 | Nicoloff, Jr. et al. | 347/43 |
| 5,774,146 | * 6/1998 | Mizutani | 347/43 |
| 5,790,150 | * 8/1998 | Lidke et al. | 347/43 |
| 5,798,776 | * 8/1998 | Uchiyama et al. | 347/43 |

* cited by examiner

Primary Examiner—N. Le
Assistant Examiner—Lamson D. Nguyen
(74) Attorney, Agent, or Firm—Fitzpatrick, Cella, Harper & Scinto

(57) ABSTRACT

A method for printing raster data on a recording medium using a plurality of ink jet nozzles includes assigning first raster data of a first set of rasters to the plurality of ink jet nozzles for printing during a first printing pass and second raster data of a second set of rasters to the plurality of ink jet nozzles for printing during a second printing pass, printing the first raster data during the first printing pass, advancing the recording medium a particular distance, printing the second raster data during the second printing pass, and advancing the recording medium the particular distance, wherein the above steps are repeated in order to print a first region of raster data on the recording medium.

24 Claims, 23 Drawing Sheets

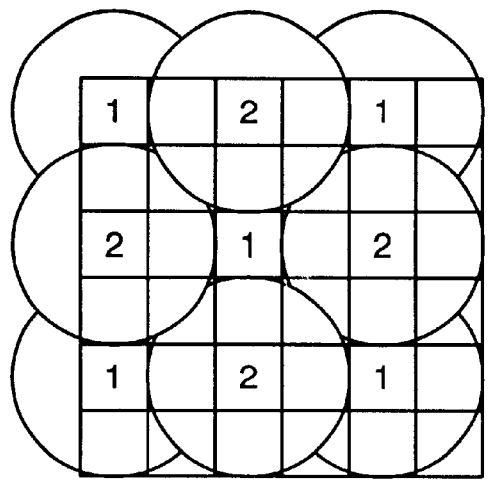
FIG. 1A
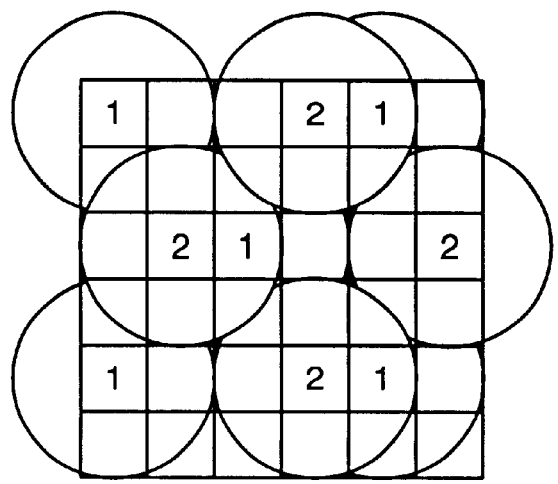
FIG. 1B
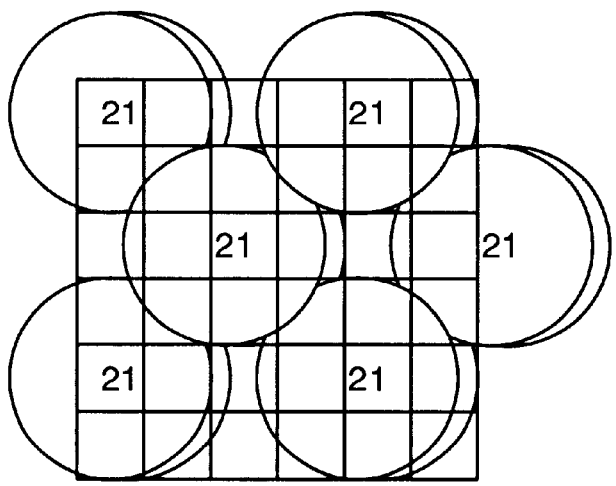
FIG. 1C
FIG. 1

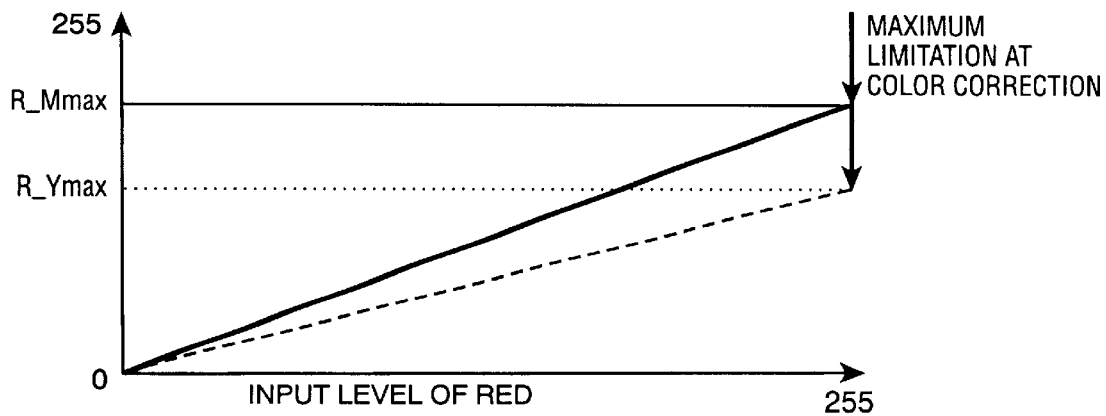
FIG. 7A
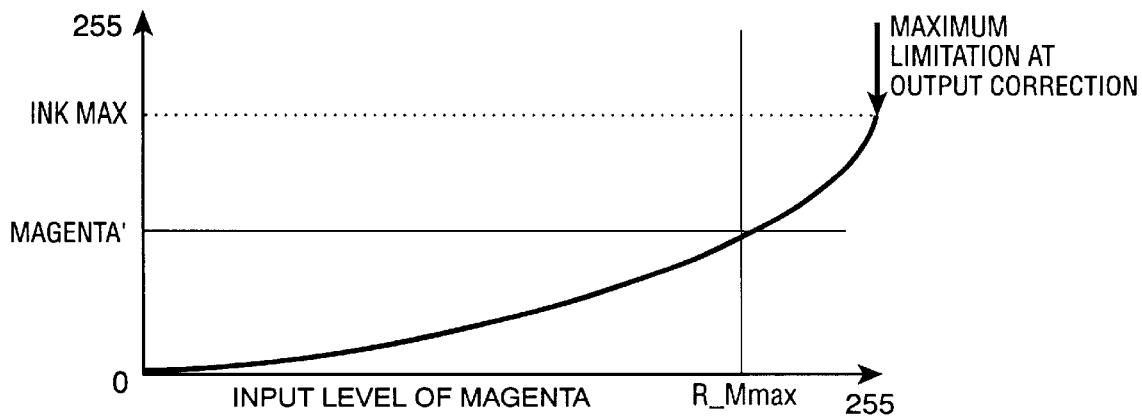
FIG. 7B
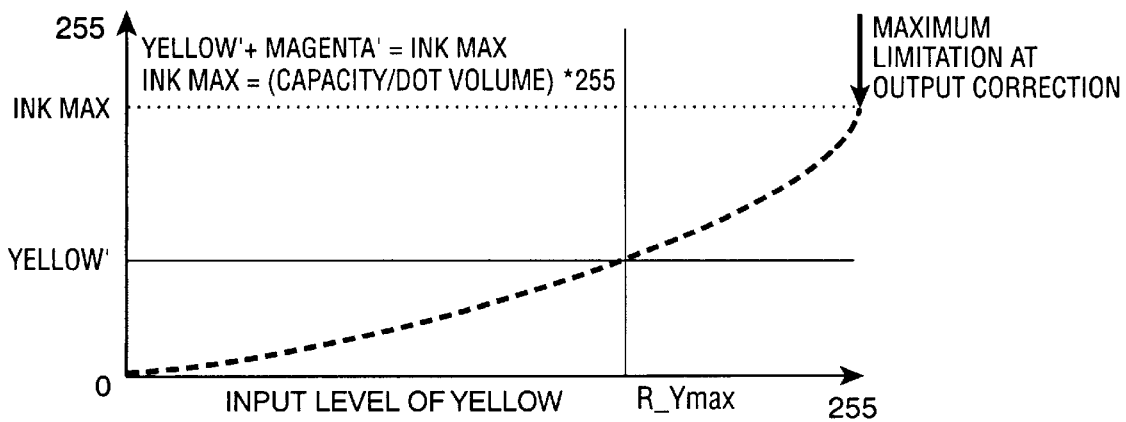
FIG. 7C
FIG. 7

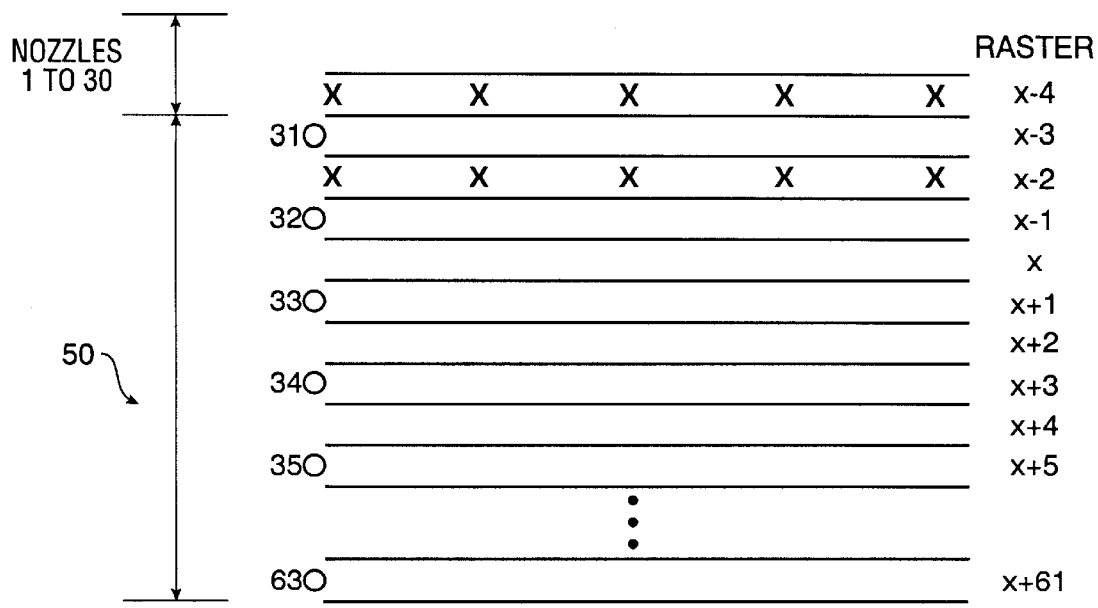
FIG. 9A
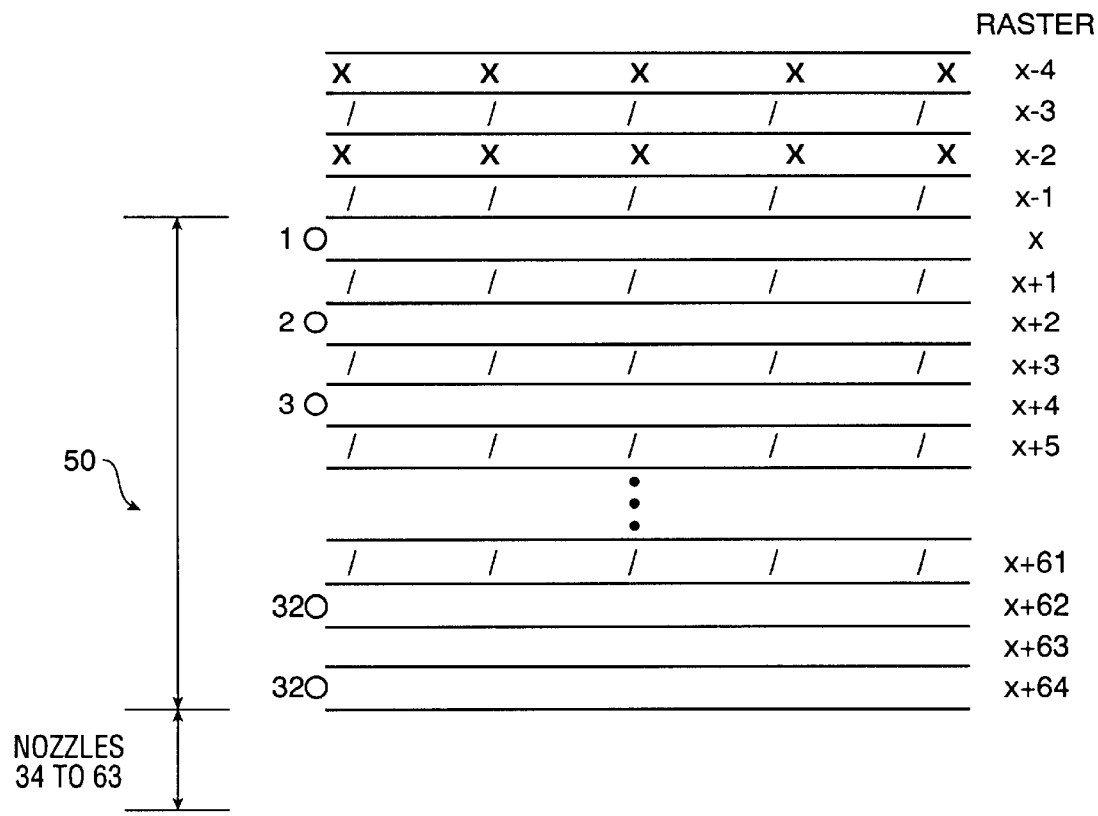
FIG. 9B
FIG. 9

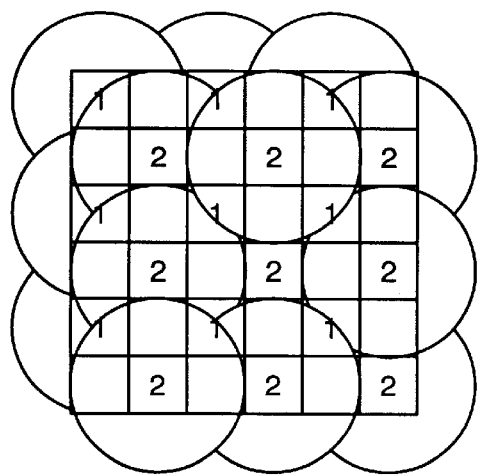
FIG. 12A
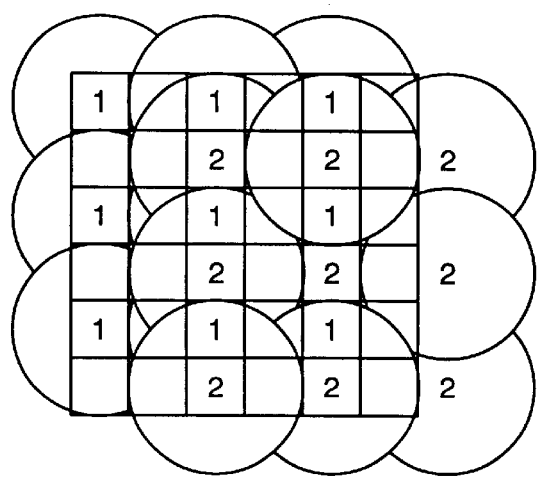
FIG. 12B
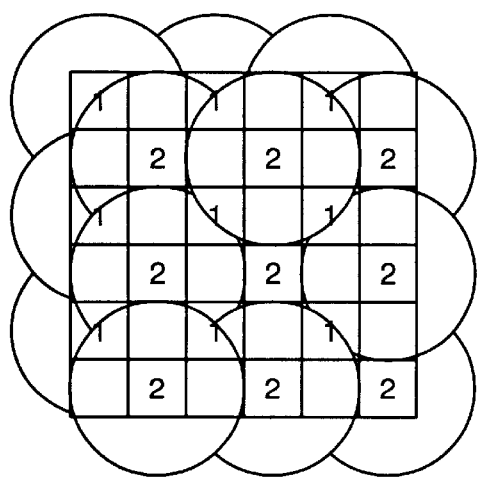
FIG. 12C
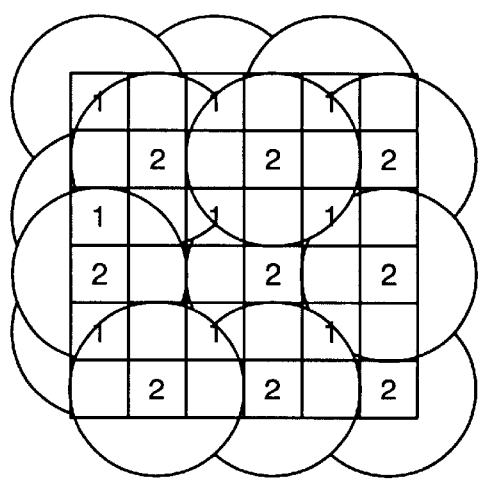
FIG. 12D
FIG. 12

MULTI-PASS BANDED PRINTING

BACKGROUND OF THE INVENTION

1. Field of the Invention

The present invention relates to ink jet printing systems for printing rasterized pixel data. In particular, the present invention relates to an ink jet printing system using multiple printing passes to print rasterized pixel data at a resolution greater than an available ink jet nozzle resolution.

2. Description of the Related Art

Conventional ink jet printing systems utilize ink jet print heads for printing pixels upon a recording medium. Ink jet print heads contain ink jet nozzles, which eject ink droplets onto the recording medium during a printing pass over the recording medium. Ink jet nozzles are separated from each other on an ink jet print head by a fixed vertical distance. The fixed vertical distance determines a nozzle resolution, which is the maximum vertical pixel resolution that can be printed by the ink jet print head in one printing pass. Accordingly, conventional printing systems cannot print pixels in one printing pass at a resolution greater than the nozzle resolution.

In addition, conventional ink jet systems often utilize multiple printing passes to reduce "banding" within printed image data. Banding usually occurs when, for example, rasters 1 to 24 are printed, followed by rasters 25 to 48, and so on. As a result, gaps may appear between rasters 24 and 25. Conversely, printed rasters 24 and 25 may overlap due to misalignment, resulting in a dark region at the area of overlap. "Multi-pass" printing attempts to address this problem by printing pixels of each raster using at least two different nozzles.

More specifically, multi-pass printing systems utilize a multi-pass mask to identify pixel data to be printed on a first printing pass and to identify pixel data to be printed on a second printing pass. Printed data resulting from such a mask is shown in FIG. 1. For discussion hereinbelow, the printed data in FIG. 1 is shown superimposed onto thirty-six $1/720$ inch×$1/720$ inch square regions.

With reference to FIG. 1A, pixels centered around a numeral "1" were printed during a first printing pass, and pixels centered around a numeral "2" were printed during a second printing pass. Moreover, the numerals are placed at the exact positions toward which their respective ink droplets were ejected. Accordingly, after converting input pixel data to an available nozzle resolution, conventional systems apply a mask to the data in order to indicate pixels which should be printed during a first printing pass, and apply a second mask to the data to indicate pixels which should be printed during a second pass.

Printed output resulting from multi-pass masking is significantly affected by horizontal misalignment between the first and second printing passes. For example, FIG. 1B shows printed output on a recording medium resulting from multi-pass masking in which a one pixel horizontal misalignment exists between the first and second printing passes. As shown, pixel coverage over the recording medium suffers. Moreover, FIG. 1C shows a two pixel misalignment between pixels of a first pass and a second pass. As shown, ink coverage of the recording medium is greatly decreased, in FIG. 1C, from the ideal situation illustrated in FIG. 1A.

Accordingly, what is needed is a system for printing rasterized data at a vertical resolution greater than an available ink jet nozzle resolution, and in which print output is less susceptible to horizontal misalignment than in conventional systems.

SUMMARY OF THE INVENTION

The present invention addresses the foregoing by printing pixel data of a first set of rasters on a first printing pass, and by printing data of a second set of rasters on a second printing pass, wherein the second rasters are interleaved between the first set of rasters. As a result, the present invention provides output of a higher vertical resolution than can be obtained on a single printing pass, and which is less susceptible to horizontal misalignments than conventional multi-pass printing.

Thus, according to one aspect, the present invention concerns a system for printing raster data on a recording medium using a plurality of ink jet nozzles. The system includes assignment of first raster data of a first set of rasters to the plurality of ink jet nozzles for printing during a first printing pass and second raster data of a second set of rasters to the plurality of ink jet nozzles for printing during a second printing pass, printing of the first raster data during the first printing pass, advancement of the recording medium a particular distance, printing of the second raster data during the second printing pass, and advancement of the recording medium the particular distance, wherein the system repeats in order to print a first region of raster data on the recording medium.

Preferably, ink limitation processing is performed on the rasterized data to create ink-limited raster data, wherein the ink limitation processing is performed in accordance with a maximum absorbency of the recording medium and an ink droplet size. In this regard, the system also preferably provides an option of printing using small ink droplets or large ink droplets.

By virtue of the foregoing multi-pass printing of selected rasters, the present invention provides an output image having a higher-resolution than a provided nozzle resolution. Moreover, the output image is less affected by horizontal print head misalignment than those images produced by conventional multi-pass systems. In addition, the foregoing provides a mechanical advantage of utilizing a single feed distance of the recording medium during multi-pass printing.

In another aspect, the present invention also includes a system to determine whether a nozzle usage to print of a next region of raster data is different from a nozzle usage to print the first region of raster data, and to print the second raster data of the second set of rasters and third raster data of a third set of rasters of the next region during the second printing pass in a case that it is determined that the nozzle usage to print the next region of raster data is different from the nozzle usage to print the first region of raster data. According to this aspect, the present invention reduces banding at a boundary between regions printed using different ink jet nozzle usages.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 1A to 1C illustrate pixels printed onto a recording medium by a conventional ink jet printing system.

FIGS. 7A to 7C illustrate ink limitation processing during color correction and output correction.

FIGS. 9A and 9B illustrate two printing pass raster selection and printing according to the present invention.

FIGS. 12A to 12D show printed pixels resulting from the FIG. 11 process steps.

DETAILED DESCRIPTION OF THE PREFERRED EMBODIMENTS

Figure 2:
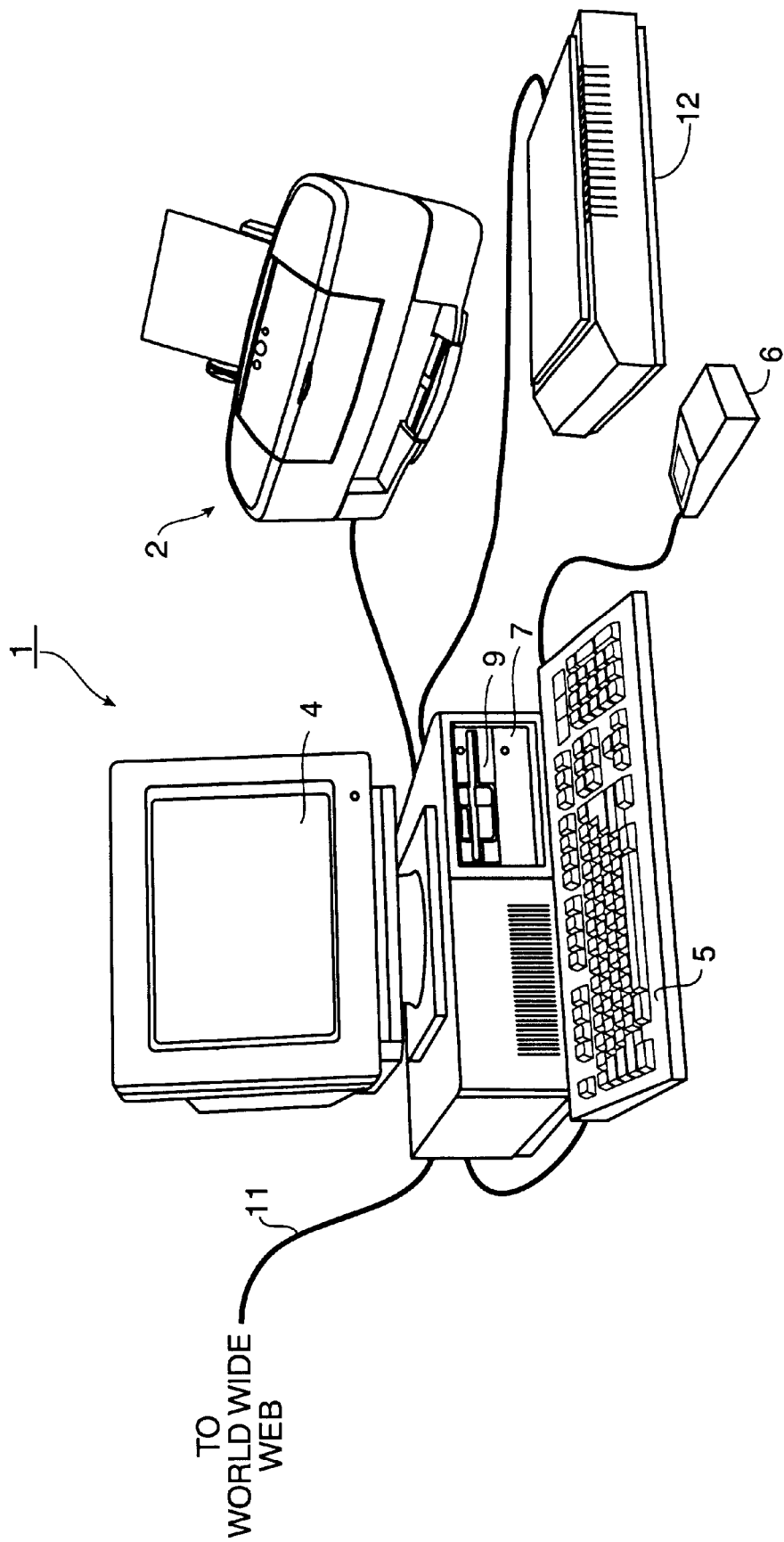
FIG. 2 is a view showing an outward appearance of a computing system embodying the present invention.

FIG. 2 is an outward view showing representative computing equipment embodying the present invention. Personal computer 1 is preferably an IBM PC-compatible computer having a windowing environment, such as Microsoft Windows 95. Provided with computer 1 is ink jet printer 2 for outputting printed documents, display screen 4 comprising a color monitor or the like, keyboard 5 for entering text data and user commands, and pointing device 6 for pointing to and for manipulating objects displayed on display screen 4.

Computer 1 includes a computer-readable memory medium such as fixed disk 7 for providing computer-readable storage. Fixed disk 7 stores, among other files, application programs by which computer 1 generates files, manipulates and stores those files on fixed disk 7, presents data in those files to an operator via display screen 4, and prints data in those files via printer 2. Fixed disk 7 also stores an operating system which, as noted above, is preferably a windowing operating system.

Device drivers are also stored in disk 7. At least one of the stored device drivers comprises a printer driver which provides a software interface to firmware in printer 2, thereby facilitating data transfer between computer 1 and printer 2. Such data transfer is described in more detail below.

Floppy disk drive 9 provides a means whereby computer 1 can access a computer-readable floppy disk storing data files, application program files, or the like. A similar CD-ROM interface (not shown) may be provided with computer 1 through which computer 1 can access program files and data files stored on a CD-ROM.

Also provided with computer 1 is World Wide Web connection 11, which may be a modem connection, an integrated services digital network (ISDN) connection or the like, through which computer 1 can download data files, image files, application program files, or computer-executable process steps embodying the present invention from the World Wide Web.

Image files may be obtained via scanner 12, which is also connected to computer 1.

FIG. 2 is a block diagram showing the internal functional architecture of computer 1. As shown in FIG. 2, computer 1 includes CPU 20 for executing computer-executable process steps, such as an Intel Pentium™ microprocessor. CPU 20 interfaces to computer bus 21. Also interfaced to computer bus 21 are scanner interface 22, printer interface 23, World Wide Web interface 26, display interface 27, keyboard interface 28, pointing device interface 29, and fixed disk 7.

Figure 3:
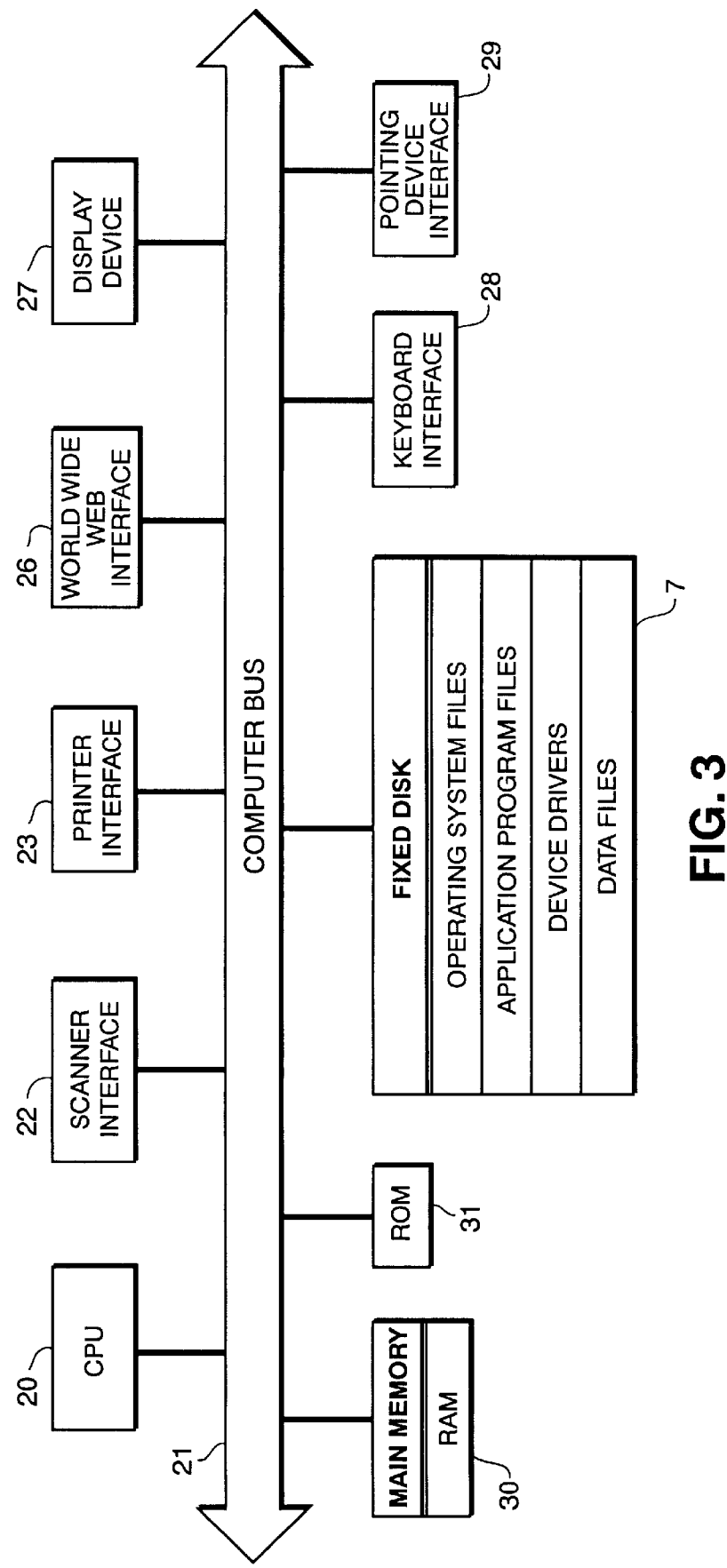
FIG. 3 is a block diagram of the internal architecture of the FIG. 2 computing system.

As shown in FIG. 3, fixed disk 7 includes a section for storing operating system program files, a section for storing application program files, a section for storing device drivers such as a printer driver to interface to printer 2, and a section for storing data files such as image files for printing via printer 2. Preferably, the application section includes computer-executable process steps to print rasterized pixel data in accordance with the present invention.

A random access main memory ("RAM") 30 also interfaces to computer bus 21 to provide CPU 20 with access to memory storage. In particular, when executing stored computer-executable process steps from disk 7 (or other storage media such as media accessed via floppy disk drive 9 or World Wide Web connection 11) into RAM 30 and executes those stored process steps out of RAM 30. RAM 30 also provides a print buffer used by a printer driver embodying the present invention. It should be understood that standard disk-swapping techniques available under the windowing operating system allow segments of memory, including the above-mentioned print buffer, to be swapped on and off of fixed disk 7.

Read only memory ("ROM") 31 stores invariant instruction sequences such as start-up instruction sequences or basic input/output operating system (BIOS) sequences for operation of keyboard 5.

Figure 4:
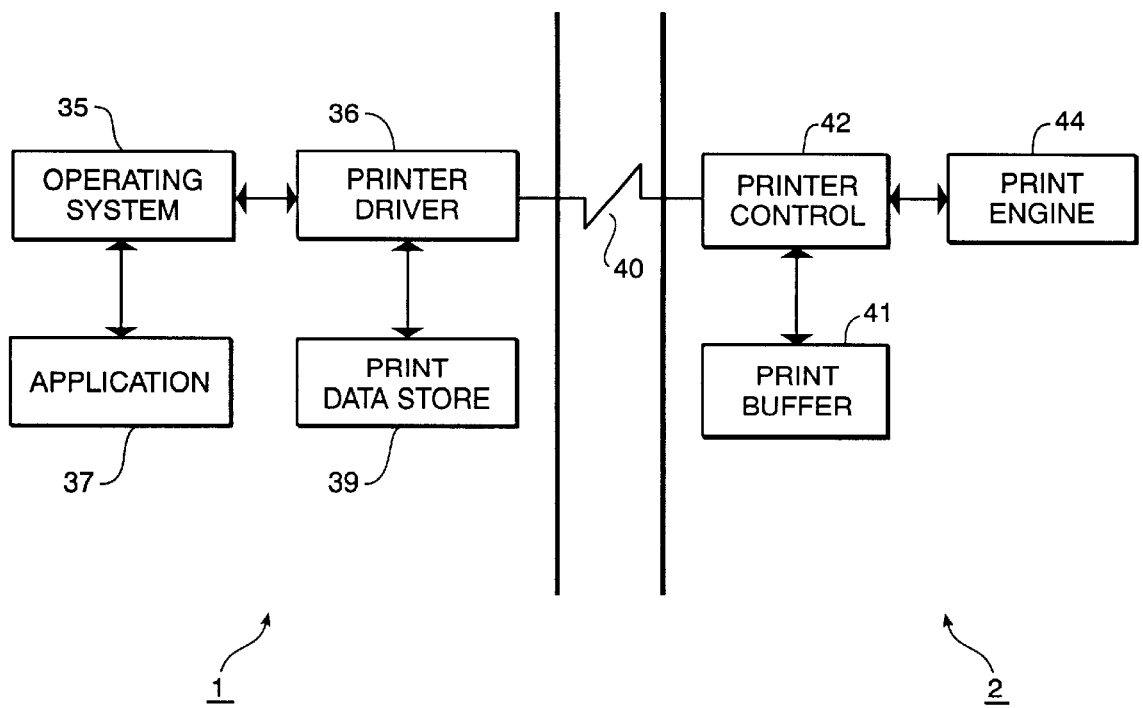
FIG. 4 is a block diagram illustrating communication between a personal computer and an ink jet printer according to the present invention.

FIG. 4 is a high-level functional block diagram illustrating interaction between computer 1 and printer 2. As illustrated, operating system 35 issues graphics device interface calls to printer driver 36 after a print instruction is issued from application 37 stored in fixed disk 7. Printer driver 36 responds by generating print data corresponding to the print instruction and stores the print data in print data store 39. Print data store 39 may reside in RAM 30 or in fixed disk 7, or through disk-swapping operations of operating system 35 may initially be stored in RAM 30 and swapped in and out of fixed disk 7.

Thereafter, print driver 36 obtains print data from print data store 39 and transmits the print data through printer interface 23, to bi-directional communication line 40, and to print buffer 41 through printer control 42. Printer control 42 processes the print data in print buffer 41 responsive to commands received from computer 1 and performs printing tasks so as to provide appropriate signals to print engine 44 for printing data onto recording media. It should be understood that print buffer 41, printer control 42, and print engine 44 are contained within printer 2.

Figure 5:
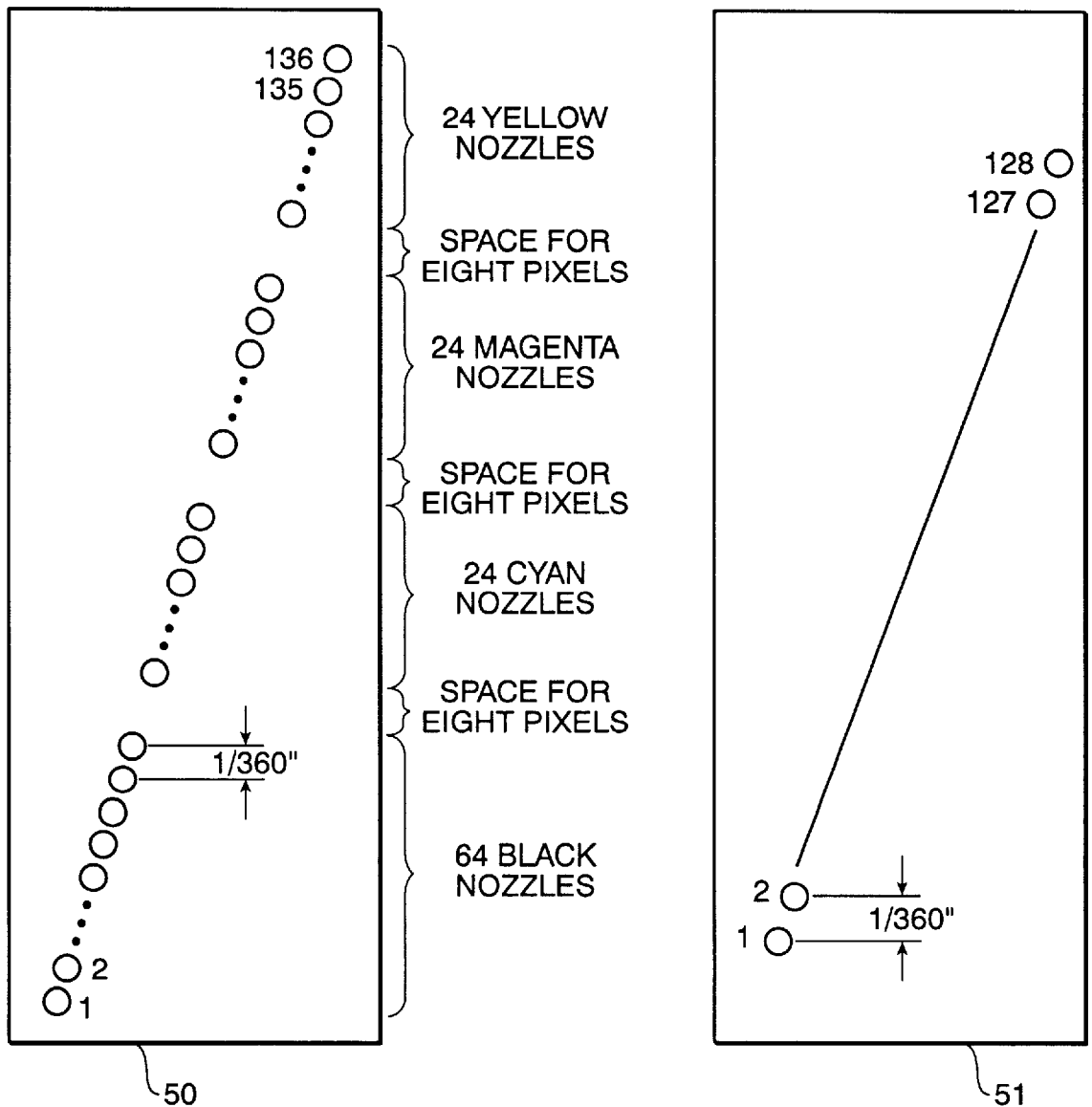
FIG. 5 is a view of ink jet printing nozzles of two ink jet print heads for use in conjunction with the present invention.

FIG. 5 is a close-up face-on view of ink jet nozzle placements on ink jet print heads which may be used in conjunction with the present invention. In this regard, print head 50 is utilized for color printing and contains 136 ink jet nozzles arranged substantially vertically. The nozzles are arranged at a slight oblique slant so that as print head 50 is moved across a recording medium, it is possible to fire the nozzles in rapid succession, rather than all at once, so as to print a vertical line. Using such a configuration, power and control requirements for firing the nozzles are reduced relative to those for firing all nozzles at once. One preferable arrangement of a slant angle would correspond to a one pixel horizontal change for every 16 vertical nozzles, at 360 dpi resolution.

Preferably, 24 nozzles of print head 50 are used for ejecting yellow ink droplets, 24 nozzles are used for ejecting magenta ink droplets, 24 nozzles are for ejecting cyan ink droplets, and 64 nozzles are used for ejecting black ink droplets. Within each color group, the centers of each nozzle are at a 1/360 inch vertical spacing from nearest neighboring nozzles.

Print head 51 includes 128 nozzles arranged substantially vertically, with each nozzle at a 1/360 inch vertical spacing from adjacent nozzles. The arrangement shown on print head 51 is preferred for single-color (such as black) printing.

In the preferred embodiment, print head 50 is either a Canon BC-21e or Canon BC-22e print head, each of which are capable of selectively ejecting small ink droplets or large ink droplets. In addition, print head 51 is preferably a Canon BC-20 printhead, which ejects large droplets of black pigment ink.

Ejected large black ink droplets weigh approximately 80 ng and correspond to a single 360 dpi×360 dpi pixel. In contrast, small black ink droplets ejected by the aforementioned print heads weigh approximately 40 ng and correspond to a single 720 dpi×720 dpi pixel. For the color inks, small and large droplet sizes are approximately one-half that of corresponding black droplets.

It should be noted that the present invention may be used in conjunction with a print head or print heads capable of firing ink droplets of one size or of several sizes. Moreover, the present invention may be utilized with a print head or print heads having a configuration other than those shown in FIG. 5.

Figure 6:
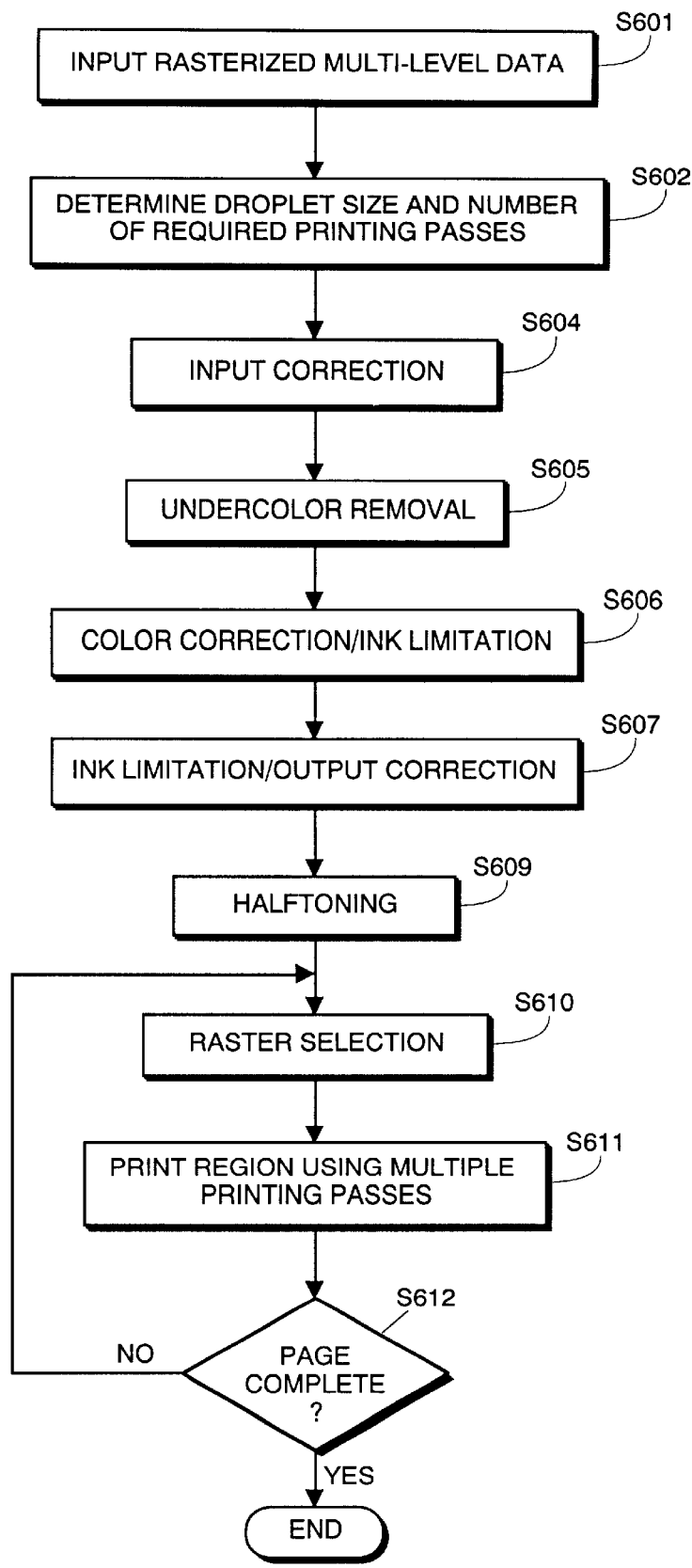
FIG. 6 is a general flow diagram for describing process steps for printing pixel data using multiple printing passes according to the present invention.

FIG. 6 is a flow diagram for describing process steps to print a page of pixel data according to the present invention. The process steps of FIG. 6 are preferably loaded into RAM 30 from fixed disk 7 and executed by CPU 20 therefrom.

Generally, multi-level rasterized data of each pixel in an image to be printed is input in step S601. By using multi-level data to represent each pixel, each pixel can be assigned one of four or more different values, in contrast to binary pixel data, using which each pixel can be represented by one of only two different values. For example, in a case that the input multi-level pixel data is black and white, or grayscale, data, each pixel in the input data may be assigned one of several shades of gray. In a case that the input data is 8-bit data, each pixel may be assigned one of 255 shades of gray.

In the preferred embodiment, the present invention is used to print color pixel data. Accordingly, each pixel represented in the input multi-level rasterized pixel data is represented by three 8-bit bytes, with each byte corresponding to one of red, green, or blue (RGB) color levels.

A droplet size is determined in step S602 based on a print mode selected by a user. A required number of printing passes is also determined in step S602, based on a nozzle resolution and a desired printing output resolution, which is also user-selectable. Nozzle resolution, as described above, reflects the vertical spacing between the centers of adjacent ink jet nozzles of a print head to be used for printing. In the case of print head 50, shown in FIG. 5 and used to describe the invention below, the nozzle resolution is 360 dpi. The determination of droplet size and required number of printing passes will be described below in greater detail with respect to FIGS. 8, 11 and 13.

In step S604, the input multi-level RGB data is subject to input, or gamma, correction.

Preferably, gamma correction is performed using the following equation:

$$\text{output} = \left(\frac{\text{input}}{\text{max. value}}\right)^{\gamma} * \text{max. value}$$

where gamma has a default value of 1.0 or 1.2, dependent upon a utilized print head combination, but can also be varied by user selection, and where max.value is equal to 255.

Also in step S604, source correction is performed in order to convert the multi-value RGB input color data into cyan, magenta, and yellow (CMY) values and to correct for source characteristics, if necessary. Preferably, source correction is calculated using the following equation:

$$C = h(R)$$

$$M = h(G)$$

$$Y = h(B),$$

with $$h(x) = 255 - x$$

$$(x = 0, 1, 2, \ldots 255),$$

where the utilized RGB values are computer-generated graphics values. Otherwise, for input data from other sources such as video or monitored generated documents, h(x) is provided via a look-up table specifically tailored to the particular input source.

Next, in step S605, undercolor removal (UCR) processing is performed on the input-corrected multi-value CMY data, so as to extract a black (k) colorant value from the CMY data. Preferably, this step is performed in accordance with the following equation:

$$K = \min(C, M, Y)$$
$$C = C - K$$
$$M = M - K$$
$$Y = Y - K$$

In step S606, color correction is performed so as to correct the multi-value CMYK data resulting from step S605 based on factors such as recording medium type, human color perception, and lighting. In particular, interdependent color processing (i.e., processing in which at least one primary color is modified based on a value for another primary color) is performed. Preferably, this step is performed using the following two substeps. First, secondary colors are generated using the following:

$$R = \min(M, Y)$$
$$G = \min(Y, C)$$
$$B = \min(C, M)$$

Next, $C_1$, $M_1$ and $Y_1$ are calculated as follows:

$$C_1 = C - G - B$$
$$M_1 = M - R - B$$
$$Y_1 = Y - G - R$$

Lastly, color corrected multi-value CMY values are determined using the following:

$$C = C_c(C_1) + M_c(M_1) + Y_c(Y_1) - R_c(R) + G_c(G) + B_c(B)$$
$$M = C_m(C_1) + M_m(M_1) + Y_m(Y_1) + R_m(R) - G_m(G) + B_m(B)$$
$$Y = C_y(C_1) + M_y(M_1) + Y_y(Y_1) + R_y(R) + G_y(G) - B_y(B)$$

Where $C_i$, $M_i$, $Y_i$, $R_i$, $G_i$, and $B_i$ for i=c, m, y are determined using look-up tables, each of which inputs integer values in the range of 0 to 255 and produces output values in the range of 0 to 255. The specific look-up tables used are selected based on detected and/or user-specified parameters. Alternatively, $C_i$, $M_i$, $Y_i$, $R_i$, $G_i$, and $B_i$ may be calculated on-the-fly and the color-corrected CMY values then obtained from the above equation.

Additional processing may also be performed in step S606. For example, techniques may be employed in order to reduce the bleeding of black ink into color areas during printing. In this regard, black ink values corresponding to particular pixels may be converted into process black values (i.e., black colorant synthesized using CMY inks), and black ink nozzles may be assigned for printing in a manner so as to reduce black ink bleeding. Such techniques are discussed in more detail below with respect to the fourth, fifth, and sixth embodiments.

In addition, the color correction of step S606 includes ink limitation based on output medium absorption characteristics. Accordingly, such ink limitation is provided by the look-up tables described above in conjunction with step S606, or, alternatively, is incorporated into on-the-fly calculations. It should be noted that the ink limitation feature of step S606 adjusts amounts of a particular colorant ink per pixel based not only upon the amount of the particular ink assigned to the pixel, but also based upon the ink amounts of the remaining colorant inks assigned to the pixel.

Specifically, ink limitation in step S606 attempts to prevent a total amount of all inks deposited upon a region of a recording medium from exceeding the maximum absorption capacity of the region. In this regard, most recording media can properly absorb only a limited amount of ink per unit area. In the case of plain paper, a maximum of 80 nanograms of ink can be absorbed in each $\frac{1}{360}$ inch × $\frac{1}{360}$ inch area. For a $\frac{1}{720}$ inch × $\frac{1}{720}$ inch area the maximum capacity is 20 nanograms, and the maximum capacity is 10 nanograms for a $\frac{1}{720}$ inch × $\frac{1}{1440}$ inch area. For some specially-coated papers, the maximum ink capacity per $\frac{1}{360}$ inch × $\frac{1}{260}$ inch area is 120 nanograms. Thus, for specially-coated paper, the maximum ink capacity is 30 nanograms and 15 nanograms for the $\frac{1}{720}$ inch × $\frac{1}{720}$ inch and $\frac{1}{720}$ inch × $\frac{1}{1440}$ inch cases, respectively. Of course, these ink amount values are approximate and may vary according to individual paper characteristics.

For example, in step S606, if an input color is pure yellow, the amount of output yellow ink will generally not need to be adjusted during step S606. Similarly, if the input color to step S606 is pure magenta, the amount of magenta ink will generally not need to be adjusted. However, if the input color is red, which is produced using both yellow ink and magenta ink, a different situation arises. In this case, both the yellow and magenta ink amounts corresponding to the red color may need to be limited in order to present the total amount of yellow and magenta ink from obtaining the maximum absorption capacity of a recording medium.

FIG. 7A illustrates the foregoing. Specifically, FIG. 7A illustrates the ink limitation of step S606 in the preferred embodiment, for a particular recording medium, and in a case that an input pixel value indicates a red color. Of course, in the preferred embodiment, the color correction/ink limitation mappings are performed on input values of CMY and K colorants. FIG. 7A is helpful in illustrating the effect of the ink limitation aspect of color correction mappings for a single color.

Thus, in FIG. 7A, the horizontal axis represents various input intensity levels of the color red and the vertical axis provides corresponding output ink amounts for magenta and yellow inks. R_Mmax and R_Ymax indicate the amounts of magenta and yellow inks that will combine to produce the color and that will result in a total ink amount for magenta and yellow inks which is equal or approximately equal to a maximum absorption capacity of the recording medium.

It should be noted that the specific shape of the curve shown in FIG. 7A, as well as the exact values of R_Mmax and R_Ymax, will depend upon factors such as ink characteristics and the absorption characteristics of the recording medium.

Returning to FIG. 6, ink limitation and output correction are performed in step S607 using a single mapping corresponding to each colorant plane. In this regard, FIGS. 7A and 7B illustrate the mappings used in step S607 for magenta ink and yellow ink, respectively. Accordingly, the mapping in FIG. 7B, shows output magenta values corresponding to input magenta values up to a value of 255. However, as mentioned above, in step S606 the maximum value of magenta is limited to R_Mmax in a case that the input color is red. As such, in step S607, in a case that the input value of magenta is equal to R_Mmax, the corresponding output is Magenta'. Summarily, with reference to FIG. 7C, in step S606 the maximum value of yellow ink has been limited to R_Ymax in a case of an input red color. Thus, in step S607, an input yellow value of R_Ymax will result in an output corrected/ink limited yellow ink level of Yellow'.

As mentioned above, R_Mmax and R_Ymax are selected in step S606 so that magenta'+yellow' is less than or equal to the maximum absorption capacity of the recording medium.

Although the above-described example of steps S606 and S607 concerns a color (red) produced using two inks (magenta and yellow), the above described ink limitation mapping similarly limits the total amounts of all inks used to the maximum absorption capacity of a recording medium for colors produced using three inks. Thus, the foregoing can provide appropriate ink limitation for colors produced using either one or more than one ink to be printed. Moreover, the two-stage ink limitation processing described above often achieves appropriate ink limitation more efficiently than conventional techniques. Steps S606 and S607 are described in more detail in commonly-assigned U.S. application Ser. No. 09/019,312, entitled "Density Separation For Multi-density Printing", filed Feb. 5, 1998, the disclosure of which is herein incorporated by reference as if set forth in full.

In a case of print data printed using a single colorant, the above-described ink limitation can be simplified. For example, for printing a page of black text, ink limitation is performed by calculating a duty cycle, which indicates the extent to which the input data must be reduced so as to avoid exceeding a maximum ink capacity of a recording medium. In this case, the duty cycle is calculated based on the maximum absorbency of the recording medium, the desired output rasterization, and the ink droplet size determined in step S602. Such calculation of a duty cycle and corresponding ink limitation processing will be described in more detail below with respect to FIGS. 8, 11 and 13.

Flow proceeds from step S607 to step S609, in which the ink-limited multi-level data is binarized. Limited multi-level data for each plane of each output pixel is translated, using binarization, into a binary value so as instruct ink jet printer 2 either to print or not to print the pixel. Such binarization may include half-toning, error diffusion, or dithering in order to improve the quality of a resulting output image. Flow then proceeds to step S610.

In step S610, raster selection is performed, in which data of each raster to be printed are assigned to an appropriate ink jet nozzle depending on the number of required passes determined in step S602. Raster selection will be described in more detail below with respect to FIG. 9.

Next, in step S611, binarized data of the region is printed using multiple printing passes. More specifically, in the case of two-pass printing, data of a set of rasters which have been assigned to print head nozzles for printing during a first printing pass are printed on a recording medium during a first printing pass. The recording medium is then advanced forward a distance determined by the nozzle resolution, the number of nozzles used during each printing pass, and the desired output resolution. Finally, data of rasters assigned to print head nozzles for printing during a second printing pass are printed during a second printing pass. Step S611 will be described in more detail below with reference to FIGS. 8, 11 and 13.

Flow proceeds from step S611 to S612, in which it is determined whether printing of a page is complete. If so, the FIG. 6 process steps terminate. If not, flow returns to step S610 in order to assign raster data of a next region to be printed to appropriate ink jet nozzles. Flow then proceeds as described above.

First Embodiment

Figure 8:
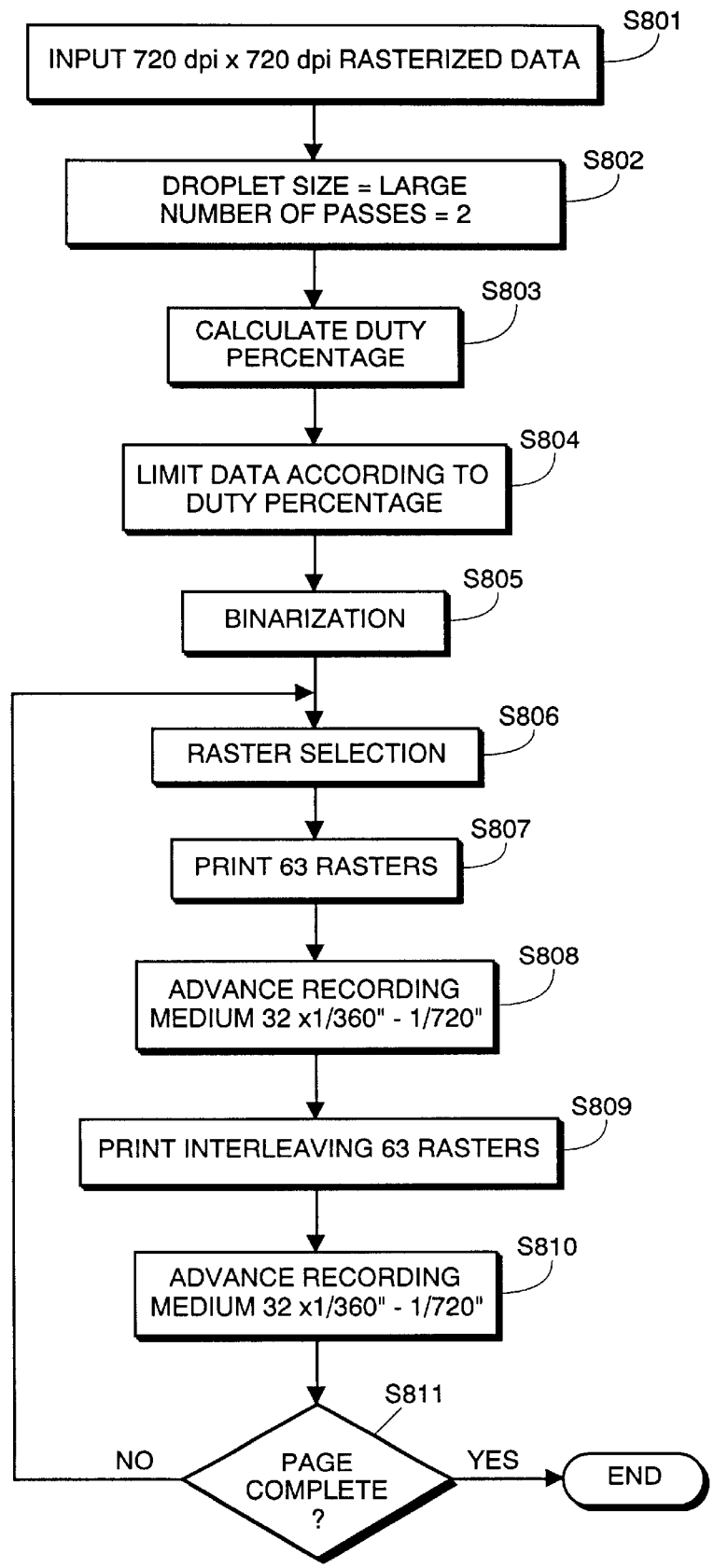
FIG. 8 is a flow diagram for describing process steps for printing 720 dpi×720 dpi black pixel data using two printing passes according to one embodiment of the present invention.

FIG. 8 is a general flow diagram for describing computer-executable process steps to print 720 dpi×720 dpi rasterized pixel data of a black and white image on a plain paper recording medium at 720 dpi×720 dpi output resolution using large droplets ejected from print head 50. The computer-executable process steps of FIG. 8 are preferably loaded into RAM 30 from fixed disk 7 and executed by CPU 20 therefrom.

Initially, in step S801, 720 dpi×720 dpi multi-level rasterized black pixel data is input. In the preferred embodiment, resolution of the input data is determined by a user selection of a printing mode. For example, user selection of a "regular" print mode, via a user interface located on printer 2 or displayed on display screen 4, causes 720 dpi x 720 dpi rasterized data to be input in step S801. In contrast, selection of a "draft" print mode results in input of 360 dpi×360 dpi rasterized data.

Next, an ink droplet size is selected in step S802 also based on the selected printing mode. In the presently-described case of "regular" printing, large ink droplets are selected in step S802.

The number of printing passes required to print an output region is also determined in step S802. The number of passes is determined by dividing the desired vertical output resolution by the nozzle resolution. Because the nozzle resolution of print head 50 is twice that of the desired output resolution (720 dpi), it is determined in step S802 that two printing passes are required.

In step S803, a maximum duty percentage is calculated in order to avoid exceeding the maximum ink capacity of the recording medium. The maximum duty percentage is calculated by the following formula:

$$\frac{\text{Maximum Ink Capacity Per Raster Unit Area}}{\text{Ink Droplet Size}}$$

The raster unit area is an area defined by the desired output horizontal and vertical print resolutions. In the present example, the raster unit area is a rectangular area of dimensions $1/720$ inch×$1/720$ inch. Accordingly, for printing 720 dpi×720 dpi black pixel data on plain paper using large ink droplets, the maximum duty percentage is 20 nanograms (approximately)/80 nanograms=25%.

In step S804, the input data is ink-limited according to the calculated duty percentage. In the present black-only example, the resulting limited data represents 25% of the black pixels originally represented by the data input in step S801. It should be noted that the data is limited in step S804 only to ensure that a maximum ink capacity for any region of a recording medium is not exceeded, and is otherwise intended to preserve the input image for accurate reproduction via printer 2.

It should also be noted that the present example concerns black-only pixel data and that, in color printing of multi-color data, each plane of color pixel data is preferably ink-limited as described above with respect to steps S606 and S607 in order to ensure that the combined ink output from each plane of data does not exceed the maximum ink capacity of any region of the recording medium.

Next, in step S805, the ink-limited data resulting from the step S804 is subject to binarization so as to provide binary values for each pixel represented by the ink-limited data.

In step S806, each black nozzle 1 to 63 of print head 50 is assigned a first raster of data to print during a first pass and a second raster of data to be printed during a second printing pass.

FIG. 9 illustrates relationships between print head nozzles and printed rasters in accordance with the present invention. For the sake of convenience, the rasters shown in FIG. 9A and 9B are representative of rasters located near the center of a page of black image data.

More specifically, as shown in FIG. 9A, nozzles 31 and 32 of print head 50 are aligned with rasters x−3 and x−1, respectively, and nozzles 33, 34, 35, and 63 are aligned with rasters x+1, x+3, x+5, and x+61, respectively. FIG. 9A is intended to illustrate a printed page upon reaching step S806 of FIG. 8, after having printed a portion of the page. As such, rasters x−4 and x−2 of FIG. 9A have previously been printed in accordance with the below-described steps S807 to S811.

Accordingly, in step S806, data of rasters x+1, x+3, x+5, and x+61 are assigned to nozzles 33, 34, 35 and 63, respectively. Although not shown, nozzles 1 to 30 are also assigned data from rasters with which these nozzles are aligned. Also in step S806, nozzles 1 to 63 are assigned data of second rasters to be printed during step S809, to be described in more detail below.

Therefore, in step S807, 63 rasters are printed corresponding to the first raster data assigned in step S806. Next, in step S808, the recording medium is advanced 32×1/360″−1/720″= 0.0875″. The resulting raster/nozzle configuration is shown in FIG. 9B. As shown in FIG. 9B, the nozzles of print head 50 are aligned with rasters which are disposed between already-printed rasters. However, nozzle 32 is not disposed between already-printed rasters since raster x+63 has not yet been printed. In this regard, raster x+63 is printed similarly to raster x, shown in FIG. 9A and 9B. As shown in FIG. 9B, the data of raster x is printed in a subsequent printing pass. Accordingly, the data of raster x+63 will be printed in a subsequent printing pass following the printing pass illustrated in FIG. 9B.

Flow then proceeds to step S810, wherein the recording medium is again advanced 0.0875″. Next, in step S811, it is determined whether an entire page has been printed. If so, the FIG. 8 process steps terminate. If not, flow returns to step S806 for additional raster selection.

Advantageously, the FIG. 8 process steps utilize 63 of the 64 black nozzles of print head 50 in order to print black pixels on a recording medium. This feature allows the recording medium to be advanced equal distances in step S808 and step S810. Accordingly, because the mechanical mechanism used to advance the recording medium can be optimized to advance 0.0875″, the potential for vertical misalignments is greatly reduced over that of conventional multi-pass systems.

It should also be noted that the FIG. 8 process steps may be used in conjunction with 128 nozzle or 24 nozzle print head configurations. In these cases, 127 nozzles and 23 nozzles are used in printing, respectively.

In contrast to the multi-pass masking technique described in the Background Of The Invention section, the present invention does not require a mask to be applied to each pixel in a region to be printed in order to determine which pixels of the region are to be printed during a particular printing pass. Rather, the present invention merely determines which of several rasters are to be printed during a particular printing pass and assigns data of those rasters to appropriate nozzles. Accordingly, the present invention is less computationally-intensive than conventional multi-pass masking. A further advantage of the present invention is shown in FIG. 10.

Figure 10:
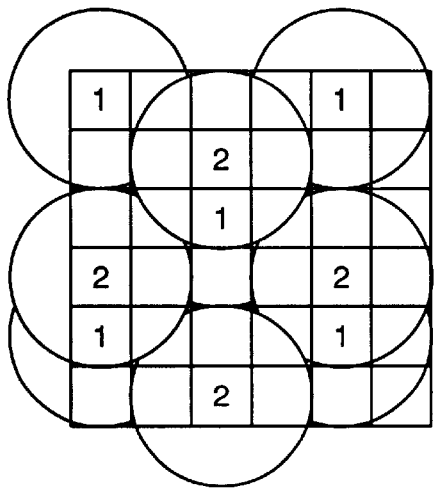
FIGS. 10A to 10D show printed pixel data resulting from the FIG. 8 process steps.
Figure 10:
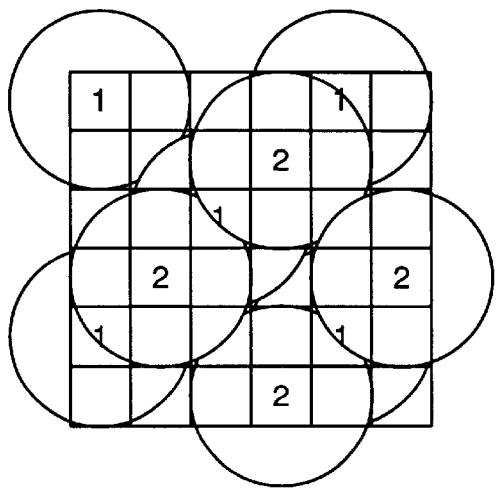
Figure 10:
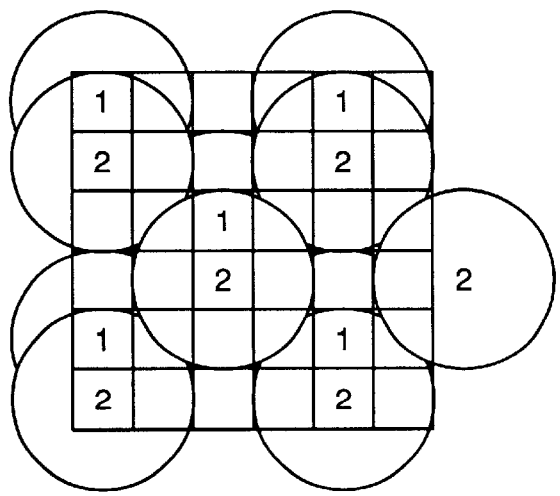
Figure 10:
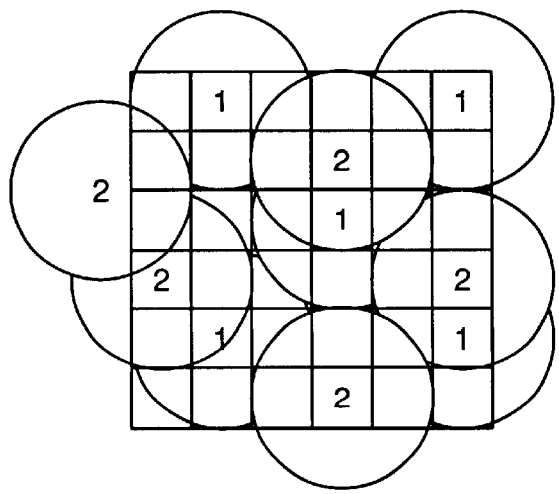

In this regard, each pixel configuration shown in FIG. 10 follows the same numbering convention as used in FIG. 1, and are shown superimposed on a grid representing thirty-six 1/720 inch×1/720 inch squares. As shown, and in accordance with the 25% maximum duty percentage calculated in step S803, pixels are printed at one of every four 1/720 inch square areas.

In FIG. 10A, the total ink coverage after the above-described printing is less than that shown in FIG. 1A. FIG. 10B shows a printed region resulting from the FIG. 8 process steps in a case that a second pass is horizontally misaligned by 1/720 inch with respect to a first pass. In this case, the resulting ink coverage more closely corresponds to that shown in FIG. 1B. In FIG. 10C, the horizontal misalignment between the first pass and the second pass is 1/360 inch. In this case, the ink coverage is significantly greater than that shown in FIG. 1C. Moreover, FIG. 10D shows a printed region resulting from the FIG. 8 process steps in a case that error-diffusion processing is applied in step S805 and in a case of a 1/720 inch horizontal misalignment. Therefore, taking into consideration potential misalignment between a first printing pass and a second printing pass, the present invention provides better net results than those produced by conventional multi-pass masking and shown in FIG. 1.

Second Embodiment

Figure 11:
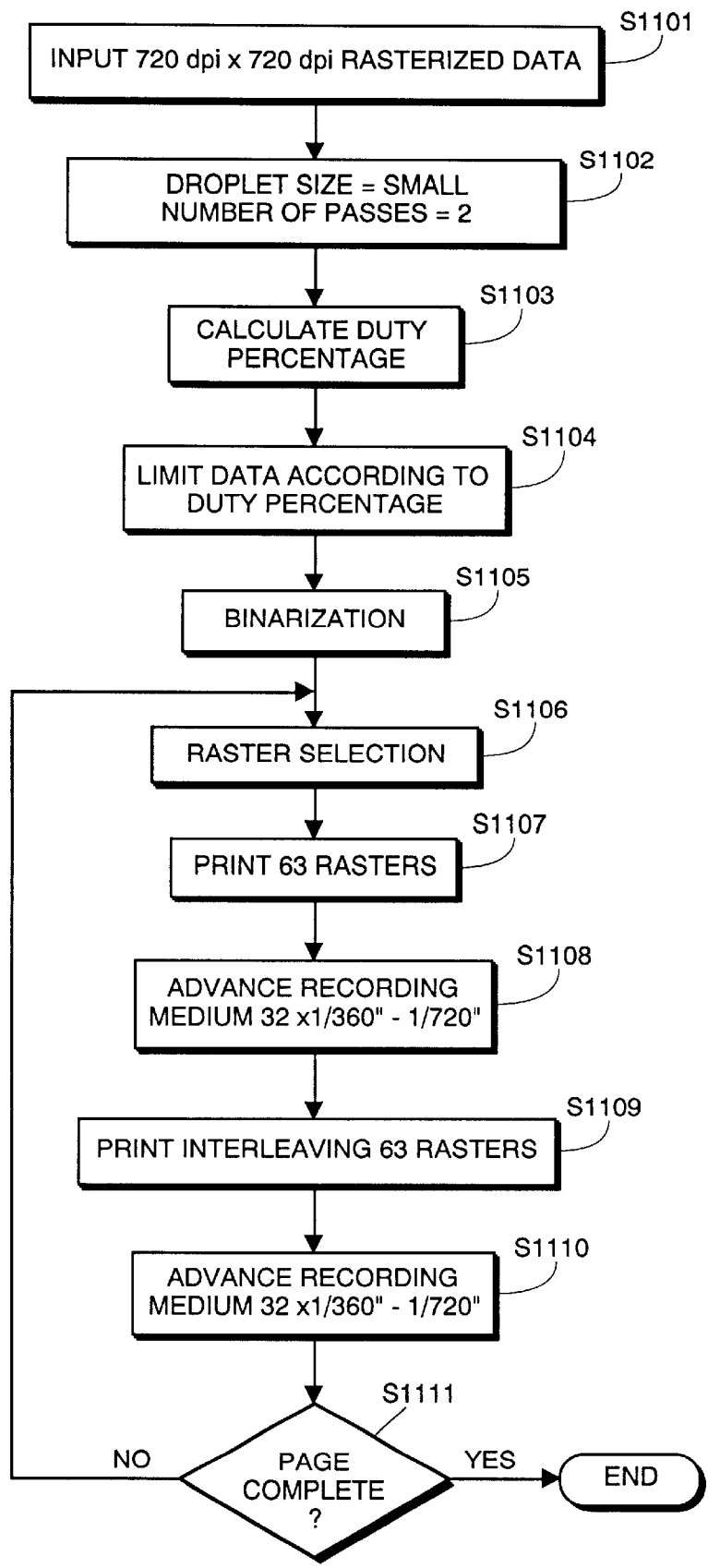
FIG. 11 is a flow diagram for describing process steps to print 720 dpi×720 dpi pixel data using two printing passes according to one embodiment of th present invention.

FIG. 11 is a flow diagram for describing process steps to print 720 dpi×720 dpi black pixel data onto a plain paper recording medium using small black ink droplets according to the present invention. First, in step S1101, 720 dpi×720 dpi multi-level raster data is input based on user selection of a "high quality" print mode. Next, in step S1102, a small droplet size is selected based on the high quality print mode selection. The number of required passes is also calculated in step S1102 as (required output resolution)/(nozzle resolution)=720 dpi/360 dpi=2.

A maximum duty percentage is calculated in step S1103. In the present example for printing 720 dpi×720 dpi pixel on plain paper, the duty percentage is equal to 20 nanograms/40 nanograms (small black droplet size)=50%. Accordingly, in step S1104, the input raster data is limited, as described above with respect to step S804, to a maximum 50% duty. The limited data is binarized in step S1105.

Next, in step S1106, each black nozzle 1 to 63 of print head 50 is assigned a first raster of data to print during a first printing pass and a second raster of data to be printed during a second printing pass. In step S1107, each of the 63 black nozzles prints its assigned first raster data in a first printing pass. The recording medium is then advanced 0.0875 inches in step S1108.

The 63 black nozzles print the second raster data in a second printing pass during step S1109 and, in step S1110, the recording medium is again advanced 0.0875 inches. If it is determined in step S1111 that a complete page has been printed, the process steps shown in FIG. 11 terminate. If a complete page has not been printed, flow returns to step S1106 and continues as described above.

Accordingly, steps S1106 through S111 proceed similarly to steps S807 through S812, except that small ink droplets are printed in step S1106 and step S1111.

In this regard, FIG. 12 illustrates printed output resulting from the FIG. 11 process steps. FIG. 12A shows an ideal case of printing 720 dpi×720 dpi pixel data using small drops according to the present invention. As shown in FIG. 12A, and in accordance with the ink limitation of steps S1104 and S1105, only 50% of the 720 dpi×720 dpi pixel areas contain a printed pixel. However, in the preferred embodiment, the small droplet size covers a greater area than 1/720 inch×1/720 inch. As a result, each 720 dpi×720 dpi area shown in FIG. 12A is covered by printed ink.

It should be noted that FIG. 12A contains twice as many pixels as FIG. 10A and that the droplet size shown in FIG. 12A, 40 ng, is half as large as the droplet size shown in FIG. 10A, 80 ng. Accordingly, both figures represent an equal amount of ink deposited upon a recording medium. However, due to the expansion characteristics of the inks on the recording medium, the deposited ink shown in FIG. 12A covers a greater surface area than that shown in FIG. 10A. Accordingly, FIG. 12A illustrates a system which prints at a higher resolution and which provides greater recording medium coverage than that shown in FIG. 10A.

FIG. 12B illustrates a result of the FIG. 11 process steps in a case that a 1/720 inch horizontal misalignment exists between the first printing pass and the second printing pass. As shown, such misalignment is not easily detectable from the print output of the FIG. 11 process steps. In contrast, FIG. 1B shows a noticeable effect from an identical misalignment.

Similarly, FIG. 12C shows good print output resulting from a 1/360 inch horizontal misalignment between a first printing pass and a second printing pass. In contrast, FIG. 1C shows a poorly-filled output region resulting from a conventional multi-pass masking system having an identical misalignment.

In addition, FIG. 12D shows that the FIG. 11 process steps provide good recording medium coverage even in a case using error diffusion processing in step S1105.

Third Embodiment

Figure 13:
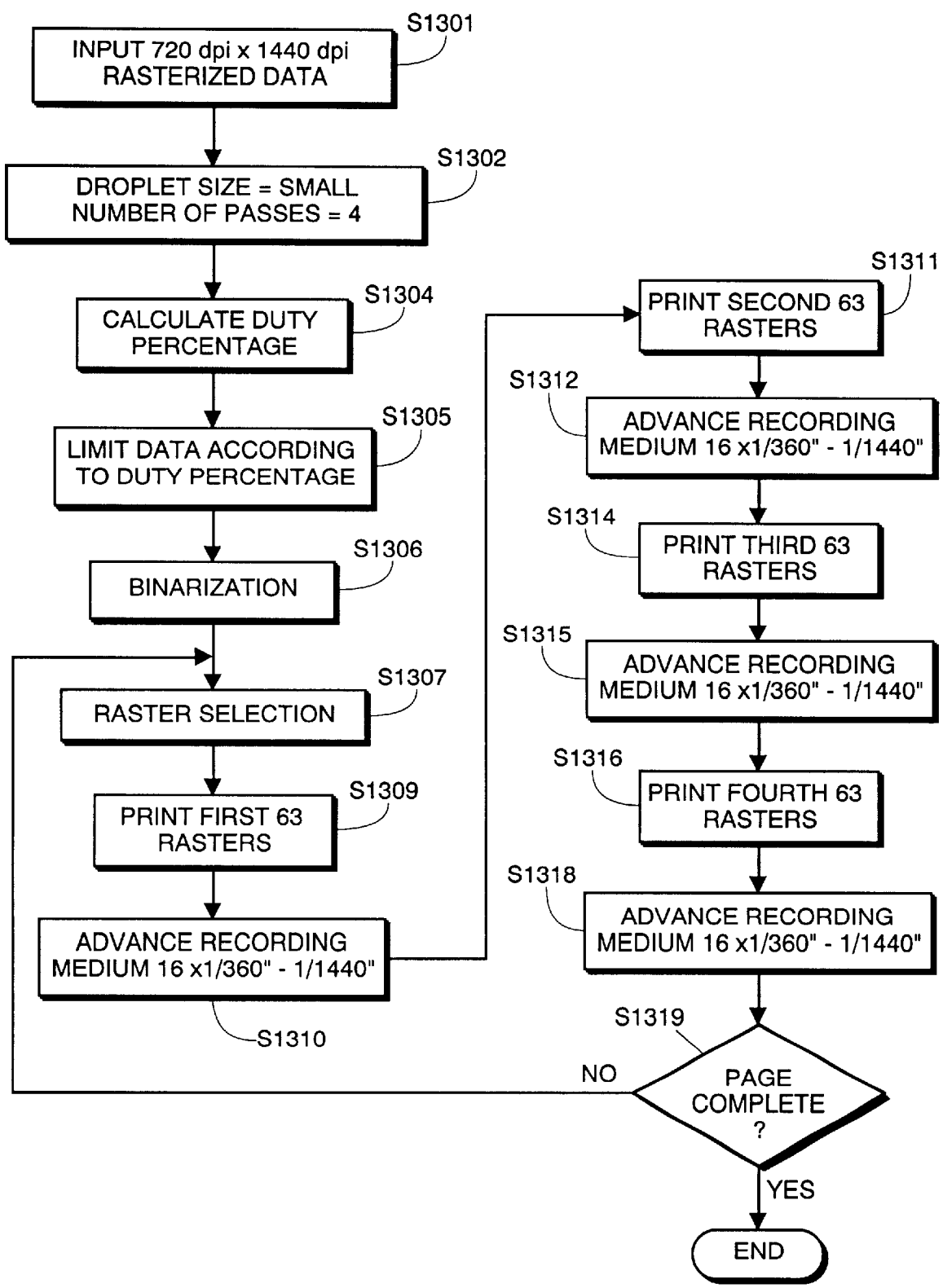
FIG. 13 is a flow diagram for describing printing of 720 dpi 1440 dpi pixel data using four printing passes according to the present invention.

FIG. 13 is a flow diagram for describing 720 dpi×1440 dpi printing of black pixel data upon a recording medium using small black ink droplets according to the present invention. In this regard, 720 dpi×1440 dpi raster data is input in step S1301 in response to user selection of a "photo" print mode. Also based on the selected print mode, a small droplet size is selected in step S1302. In addition, due to the 360 dpi nozzle resolution of print head 50 and the desired 1440 dpi output resolution, the required number of printing passes is calculated in step S1302 as 1440 dpi/360 dpi=4.

The maximum duty percentage is calculated in step S1304. As described above, based on a maximum ink capacity of 80 nanograms per 360 dpi×360 dpi area, the maximum ink capacity of a 720 dpi×1440 dpi area is equal to 10 nanograms. Accordingly, using small ink droplets having a size of 40 nanograms, the maximum printing duty is equal to 10 nanograms/40 nanograms=25%. Therefore, the input raster data is limited in step S1305 according to a 25% maximum duty percentage.

The ink-limited raster data is binarized in step S1306. Next, in step S1307, each black nozzle 1 to 63 of print head 50 is assigned a first raster of data to print during a first printing pass, a second raster of data to be printed during a second printing pass, a third raster of data to be printed during a third printing pass, and a fourth raster of data to be printed during a fourth printing pass. Accordingly, in step S1309, each of the 63 black nozzles prints a first raster of data during a first printing pass. The recording medium is then advanced 16×1/360"−1/1440"=0.04375"in step S1310.

Figure 14A:
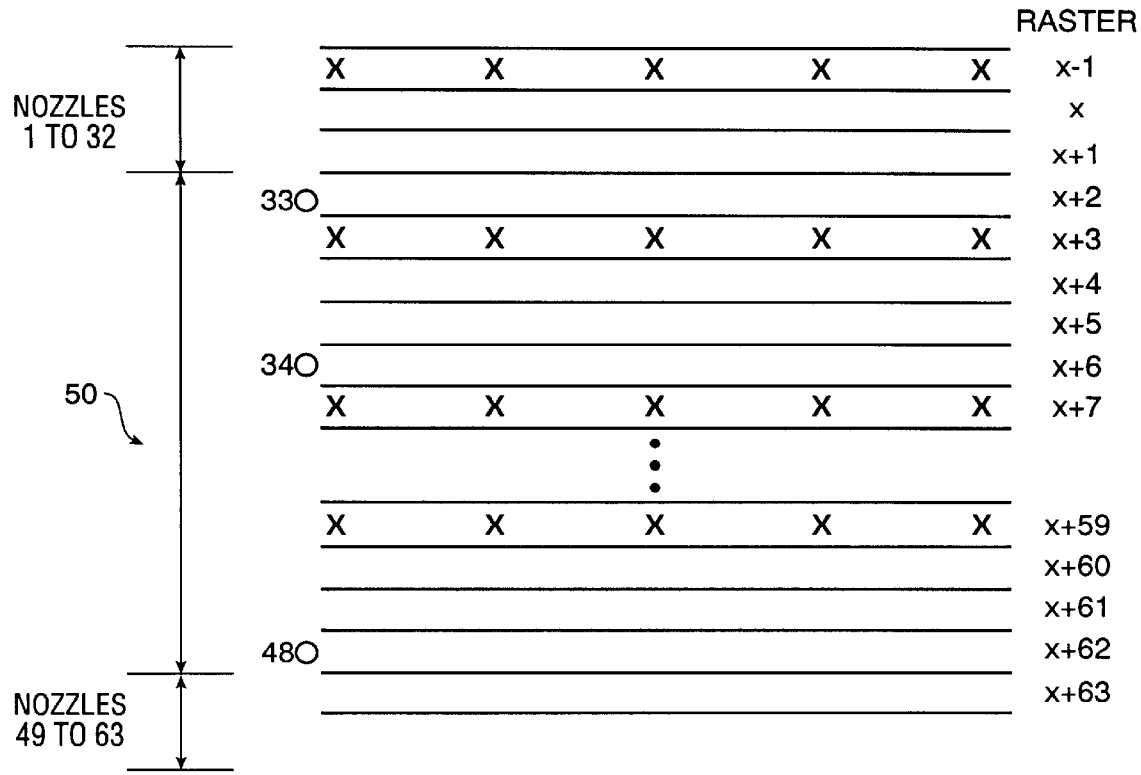
FIGS. 14A to 14C illustrate four printing pass raster selection and printing according to the present invention.

FIG. 14A shows the nozzles of ink jet print head 50 in relation to printed and unprinted rasters on a recording medium after step S1310. In this regard, "x"'s indicate that rasters x−1, x+3, x+7, and x+59, among others, were printed during a first printing pass in step S1309 by nozzles 48, 49, and 50, respectively. As shown in FIG. 14A, after execution of S1310, nozzles 33, 34, and 48 are aligned with rasters x+2, x+6, and x+62.

In step S1311, nozzles 1 through 63 each print a second raster during a second printing pass. Next, in step S1312, the recording medium is again advanced 0.04375 inches.

Figure 14B:
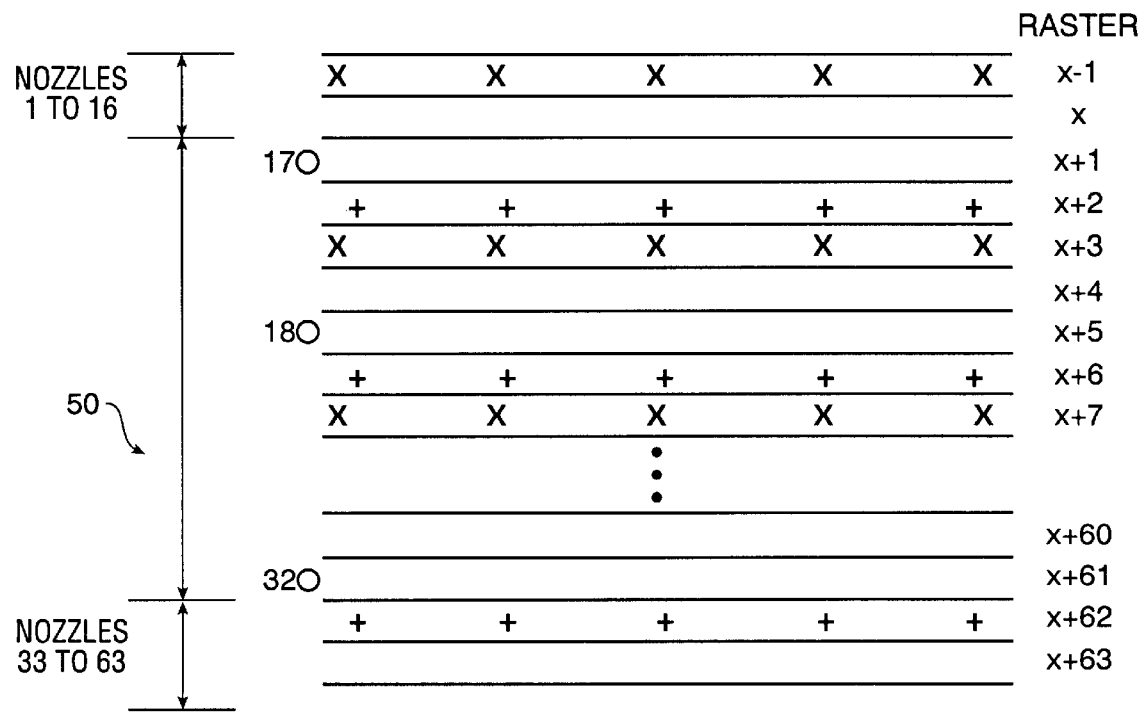

FIG. 14B shows the nozzles of print head 50 in relation to rasters of the recording medium after execution of steps S1312. In this regard, "+"'s indicate rasters printed during step S1311. In this regard, nozzles 33, 34, and 48 were used to print rasters x+2, x+6, and x+62, respectively, during step S1311. As shown in FIG. 14B, nozzles 17, 18, and 32 are aligned to print rasters x+1, x+5, and x+61 during a third printing pass, which is performed in step S1314. Flow proceeds through steps S1315 and S1316 so as to print a fourth set of 63 rasters using nozzles 1 to 63. For example, rasters x, x+4, and x+60 are printed using nozzles 1, 2, and 16 of print head 50 during a fourth printing pass.

Figure 14C:
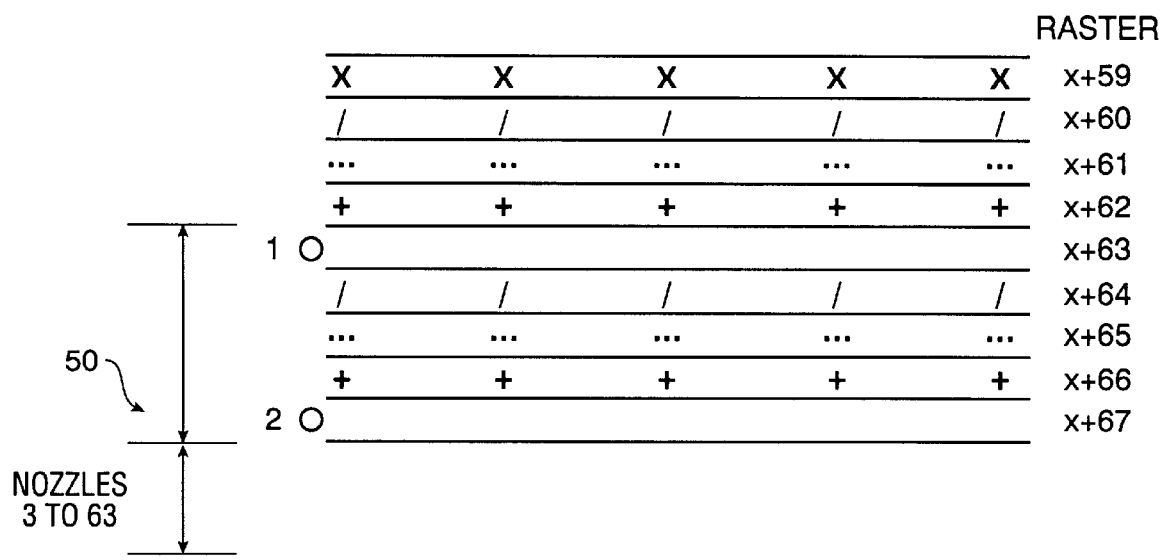
Figure 14:
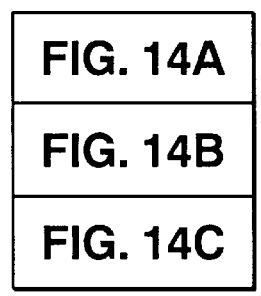

The recording medium is again advanced 0.04375" in step S1318. FIG. 14C shows a portion of the recording medium after the previously-described execution of steps S1301 to S1318. In FIG. 14C, " - - - "'s indicate rasters printed during step S1314 and "/"'s indicate rasters printed during step S1316. It should be noted that nozzle 1 is aligned with raster x+63. Accordingly, during a next printing pass, nozzle 1 is used to print the data of raster x+63. In this regard, flow proceeds from step S1318 to step S1319, wherein it is determined whether an entire page has been printed. If so, the process steps of FIG. 13 terminate. If not, flow returns to step S1307 to perform raster selection as described above.

It should be understood that the duty percentage calculation and data limitation of steps S803 and S804, S1103 and S1104, and S1304 and S1305 may be substituted with steps to select an output table corresponding to a selected droplet size and required number of passes, and to apply the output table to the input rasterized data to produce ink-limited rasterized data. Such a substitution provides the advantage of faster processing but requires precalculation and storage of a plurality of such output tables.

Fourth Embodiment

The above-described flow diagrams of FIG. 8, FIG. 11, and FIG. 13 describe process steps to print a page of black pixel data. However, modern documents often include several colors and types of pixel data. For example, a document may contain color photographs, high-resolution black and white images, and low-resolution black text. Accordingly, it is often desired to print such documents so as to accurately reproduce the several types of data located in the original document.

Figure 15:
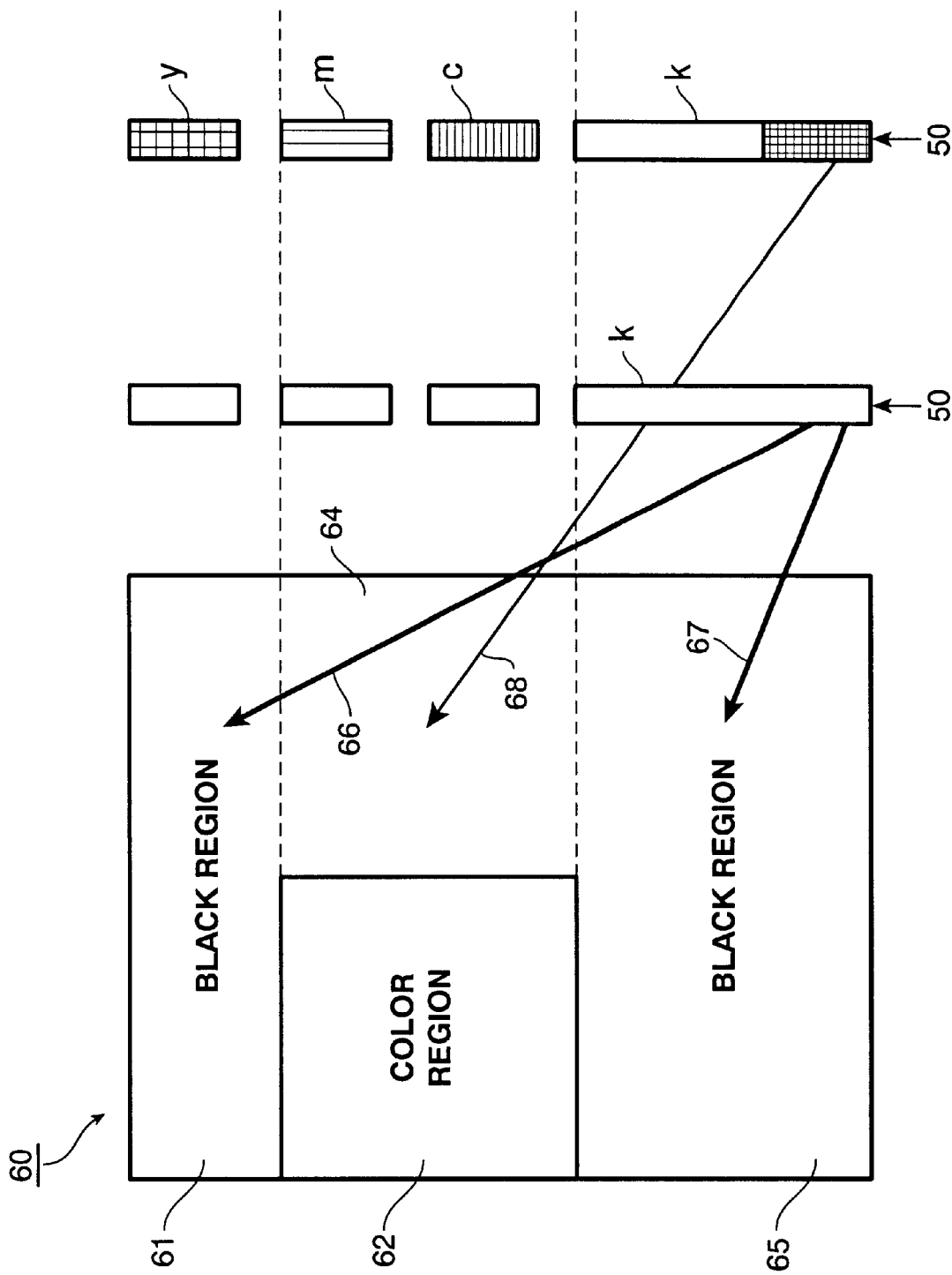
FIG. 15 illustrates printing of different regions of a page using different nozzle configurations according to the present invention.

FIG. 15 shows document image 60 which is composed of various data types. Particularly, image 60 is composed of region 61 which is a region of low-resolution black text, color region 62 which is a high-resolution color image, region 64 which contains only black pixels and is located on rasters also corresponding to color region 62, and black region 65 which is composed of low-resolution black pixels.

Shown to the right of document image 60 in FIG. 15 are representations of ink jet nozzles of an ink jet print head such as print head 50, which for the foregoing discussion corresponds to a Canon BC-21e ink jet print head.

Arrows 66 and 67 indicate that black regions 61 and 65 are preferably printed using the above-described direct rasterization technique and 63 black nozzles of print head 50. As described above, print head 50 is capable of printing small black ink droplets and large black ink droplets. Accordingly, black region 61 may be printed using small black ink droplets or large black ink droplets. Similarly, black region 65 may be printed using small black ink droplets or large black ink droplets.

In contrast, arrow 68 indicates that region 64 is printed with a bottom 23 black nozzles of print head 50. In this regard, region 64 and color region 62 are located on common rasters. As such, it is desired to prevent bleeding of black ink from region 64 to region 62. Accordingly, the distance at which the bottom 24 black nozzles of print head 50 are offset from the color nozzles of print head 50 results in a reduction of bleeding when printing using such a nozzle configuration. Moreover, the above-described printing of region 64 enables the rasters of region 62 to be printed using equal-width bands of colorant. Accordingly, the foregoing arrangement reduces processing demands.

It should be understood that the reduction of processing demands is experienced when using any 23 of the 64 black nozzles of print head 50 to print region 64. However, as described above, use of the bottom 23 nozzles reduces bleeding into color region 64. Preferably, color region 62 and region 64 are printed using small ink droplets so as to achieve high resolution.

Figure 16:
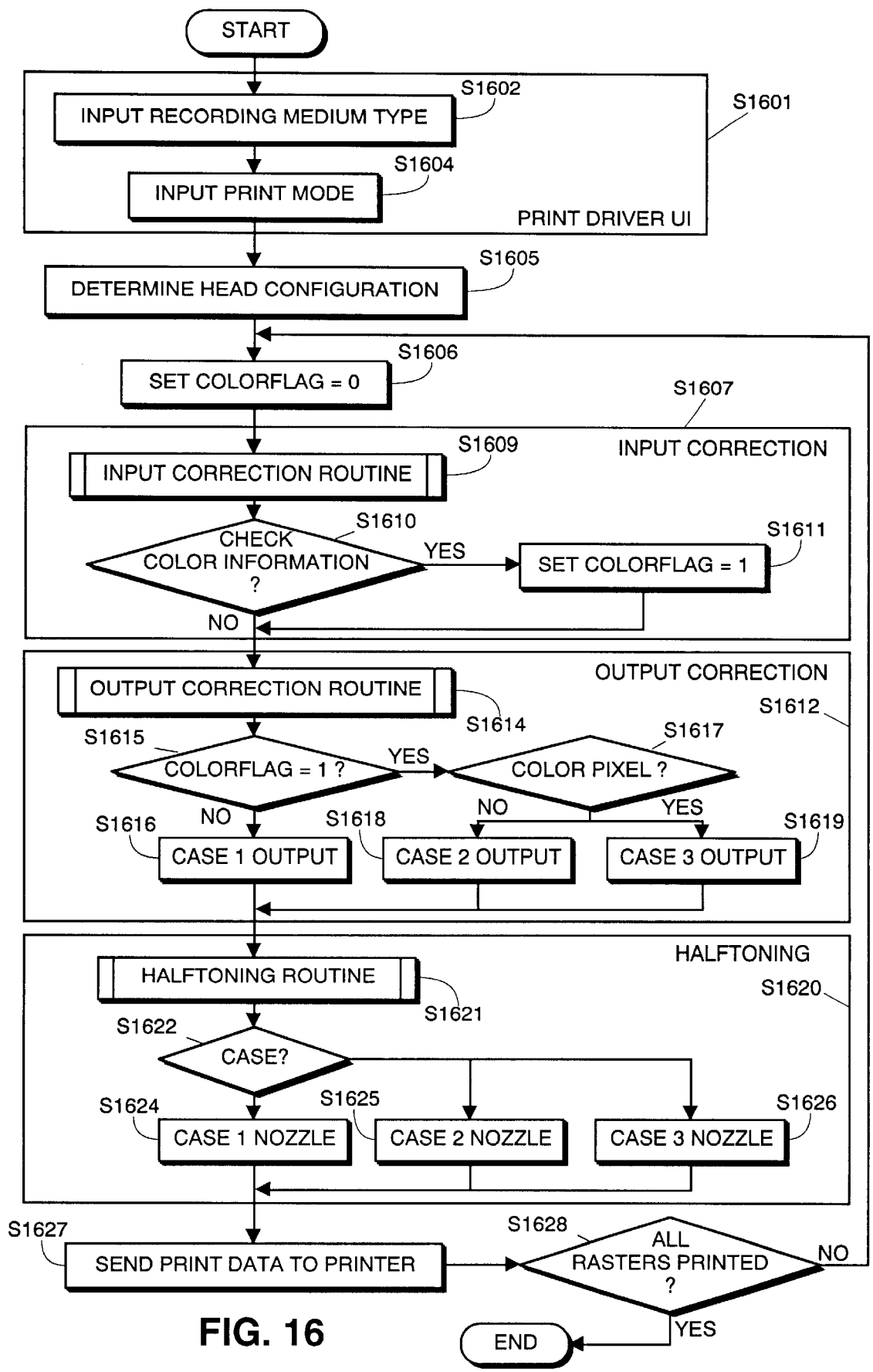
FIG. 16 is a flow diagram for describing process steps to print different regions of a page using various nozzle configurations in accordance with the present invention.

FIG. 16 is a flow diagram describing process steps to print documents having various image types onto a recording medium using various nozzle configurations of a print head.

The FIG. 16 process steps begin at step S1601, wherein a user is prompted for information by a user interface included with printer driver 36. In particular, in step S1602, a print medium type is input. Similarly, in step S1604, a desired print mode is input.

Next, in step S1605, an available print head configuration is determined. As will be described below with respect to FIG. 17 and 18, the print head configuration determines the content of subsequent steps in the FIG. 16 flow diagram. Next, in step S1606, a color flag is set to zero.

Input correction is performed in step S1607. More specifically, step S1607 consists of an input correction routine (S1609) in which a band of rasterized data to be printed is input. The input correction routine preferably operates in accordance with the above-described step S604. Next, in step S1610, it is determined whether the input-corrected data contains color information. If so, the color flag is set equal to one and flow proceeds to step S1612. If not, flow proceeds directly from step S1610 to step S1612.

Step S1612 is an output correction step which comprises steps S1614 to S1619. Step S1614 is an output correction routine preferably corresponding to step S607 described above. After application of the output correction routine, it is determined in step S1615 whether the color flag is equal to one. If not, flow proceeds to step S1616.

For the case shown in FIG. 15, in which one print head is capable of printing color pixels is used, step S1616 indicates that the pixel data is to be printed using 63 of the 64 black nozzles of print head 50, as described above with respect to FIGS. 8, 11 and 13. Such a situation arises in a case that data of regions 61 or 65 is input in step S1609.

If, in step S1615, it is determined that the color flag is equal to 1, flow proceeds to step S1617, wherein it is determined whether a subject pixel is a color pixel (not black only). If the pixel is not a color pixel, as in the case of pixels within region 64, flow proceeds to step S1618, wherein it is determined to print black pixels in the subject color rasters using the bottom 23 black nozzles of print head 50, as shown by arrow 68 of FIG. 15.

For the color pixels in the input band, flow proceeds to step S1619, wherein it is determined that the color pixels are to be printed using 23 cyan nozzles, 23 magenta nozzles, 23 yellow nozzles, and the bottom 23 black nozzles of print head 50. Flow then proceeds to step S1620 for halftoning. Step S1620 includes steps S1621 to step S1626.

Step S1621 comprises a halftoning routine preferably corresponding to step S609. Next, in step S1622, flow proceeds to either step S1624, step S1625, or step 1626 based on the pixel output determined in step S1612. Particularly, for pixels to be printed using 63 of the 64 black nozzles of print head 50 (case 1), appropriate nozzle assignments are performed. For black pixels to be output using the bottom 23 black nozzles of print head 50 (case 2), appropriate nozzle assignments are made in step S1625. Finally, for color pixels to be printed using 23 nozzles of each of the yellow, magenta, cyan, and black nozzles, appropriate nozzle assignments are made in step S1626.

Next, in step S1627, print data for the input band is sent to printer 2. If all rasters of page 60 have been printed in step S1628, the FIG. 16 process steps terminate. If not, flow returns to step S1606 for input of an next band of print data.

By virtue of the foregoing process steps, high resolution portions of a document page can be printed using high-resolution ink droplets, while low-resolution portions of the same document page can be printed using low-resolution ink droplets, thereby resulting in faster printing of the document page as compared to systems which must use high-resolution printing of an entire document page in order to print a high resolution portion of the document page.

Fifth Embodiment

The present invention provides additional benefits when used in conjunction with a dual head ink jet printing system. Such systems provide the benefit of fast printing when using two identical print heads, and provide other benefits when using print heads having different characteristics. Such a situation is illustrated in FIG. 17.

Figure 17:
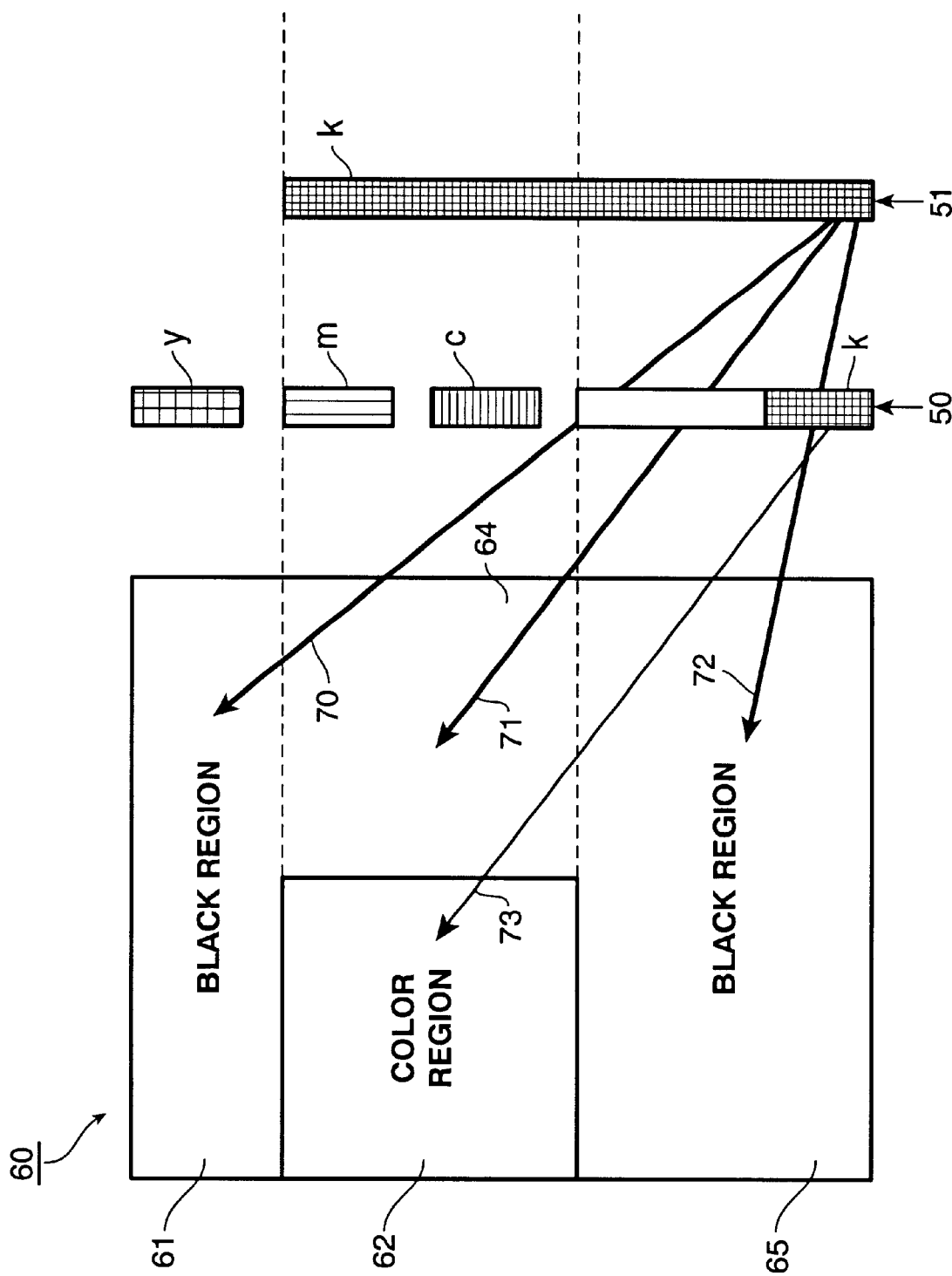
FIG. 17 illustrates a method for printing different regions of a page using two different print heads in accordance with the present invention.

FIG. 17 shows document image 60 of FIG. 15, which includes regions 61, 62, 64, and 65 as described above with respect to FIG. 15. Adjacent to document image 50 is shown a representation of two print heads for use in printing document page 60 according to the present embodiment. Directly to the right of document image 60 is a representation of print head 50, which as described above, is preferably a Canon BC-21e print head. To the right of print head 50 is a representation of print head 51, which, as described above, is preferably a Canon BC-20 print head capable of printing large black droplets of pigment-based ink. As described above with respect to FIG. 5, print head 51 contains 128 ink jet nozzles.

Arrow 70 indicates that black region 61 is to be printed using large black droplets of pigment ink ejected from 127 nozzles of print head 51 in a manner such as that described above with respect to the first, second, and third embodiments. In addition, arrows 71 and 72 indicate that areas 64 and 65 are also to be printed using large black droplets of pigment ink ejected from 127 nozzles of print head 51. Arrow 73 indicates that color region 62 is to printed using 23 nozzles each of yellow, magenta, cyan, and black nozzles of print head 50. As shown in FIG. 17, the 23 black nozzles utilized to print color region 62 are preferably the bottom 23 black ink nozzles of print head 50. Also in the preferred embodiment, color region 62 is printed using small droplets ejected from each of the utilized nozzles of print head 50.

Printing of document image 60 using the print head configuration shown in FIG. 17 will be described below with respect to the process steps of FIG. 16. As described above, recording medium type and print mode are input in step S1601. In step S1605, it is determined that a BC-21e print head and a BC-20 print head will be used to print document image 60. Next, in step S1606, a color flag is set to zero. In step S1607, a band of image data is input, input correction is performed and it is determined whether the band contains color information. If so, a color flag is set equal to one and flow continues to step S1612. If not, flow simply continues to step S1612.

Within step S1612, output correction is performed in step S1614. It should be noted that, because print head 50 ejects small dye droplets onto certain portions of the recording medium and print head 51 ejects large pigment droplets onto mutually exclusive other portions of the recording medium, output correction in step S1614 should be applied to each of the small droplet receiving areas and the large droplet receiving areas individually.

In step S1615, it is determined whether the color flag is equal to one. If not, it is determined in step S1616 that each pixel in the input band is to be printed with large pigment droplets ejected from 127 nozzles of print head 51. If the color flag is equal to one in step S1615, it is determined that each non-colored (black) pixel in the band will be printed using large droplets of pigment ink ejected from 127 nozzles of print head 51. In order to print color pixels within the band such as color pixels of color region 62, step S1619 determines that the color pixels should be printed using 23 nozzles each of the yellow, magenta, cyan, and black nozzles of print head 50. Preferably, the 23 black nozzles used to print region 62 are the bottom 23 black nozzles of print head 50.

In step S1620, halftoning is performed on the output-corrected pixel values, and nozzle assignments for each pixel are determined based on the determinations in steps S1616, S1618, and S1619 of output correction step S612. Next, in step S1627, print data for the band of pixels is sent to printer 2. If all rasters of page 60 have not been printed, flow proceeds from step S1628 to step S1606. If so, the process steps of FIG. 16 terminate.

Advantageously, use of the FIG. 16 process steps in conjunction with the head configuration shown in FIG. 17 provides fast high-resolution printing having little intercolor bleeding and having high-contrast black pigment color.

Sixth Embodiment

Figure 18:
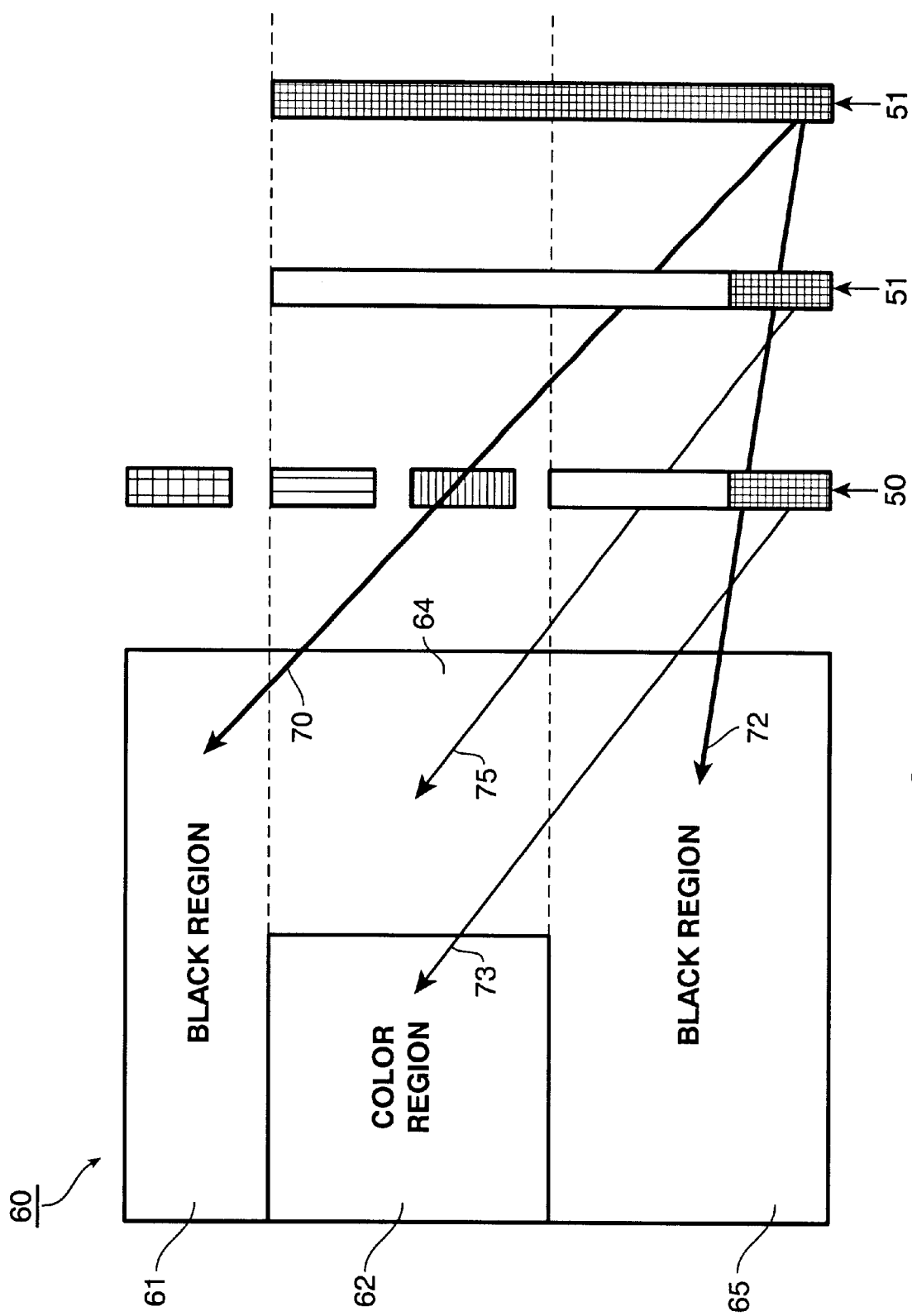
FIG. 18 illustrates an alternative method for printing different regions of a page using two different print heads according to the present invention.

FIG. 18 illustrates an alternative printing method using the head configuration shown in FIG. 17. As shown in FIG. 18, various regions of document image 60 are printed using print head 50 and print head 51. Advantageously, however, and as indicated by arrow 75, black pixels in region 64 are printed using the bottom 23 nozzles of print head 51. By doing so, bleeding of black pigment ink from region 64 to printed region 62 is reduced. In particular, use of the bottom 23 black ink jet nozzles of print head 51 to print area 64 creates a greater time interval between the printing of area 64 and the printing of area 62 in comparison to use of the upper 23 black nozzles, thereby reducing bleeding between the regions.

In order to print document 60 using the head configurations and nozzle selection shown in FIG. 18, the FIG. 16 process steps are executed in a manner similar to that described with respect to FIG. 17. In this regard, output correction (ink limitation) for each of print heads 50 and 51 should be performed separately since each print head prints different areas of document image 60. However, steps S1618 and S1625 execute differently than described with respect to FIG. 17 in order to print page 60 as shown in FIG. 18. In particular, it is determined in steps S1618 and S1625 that black pixels within a color region such as the pixels of region 64 are to be printed using the bottom 23 nozzles of print head 51.

Advantageously, the present embodiment provides fast printing of a page containing high-resolution data and also provides reduced bleeding between regions printed with pigment ink and regions printed with dye ink.

Seventh Embodiment

Direct rasterization multi-pass printing, such as that described with respect to the first, second and third embodiments, is often quite effective in reducing the banding problem described in the present Background Of The Invention. Multi-pass direct rasterization printing addresses the problem by printing regions which overlap previously printed regions.

Figure 19:
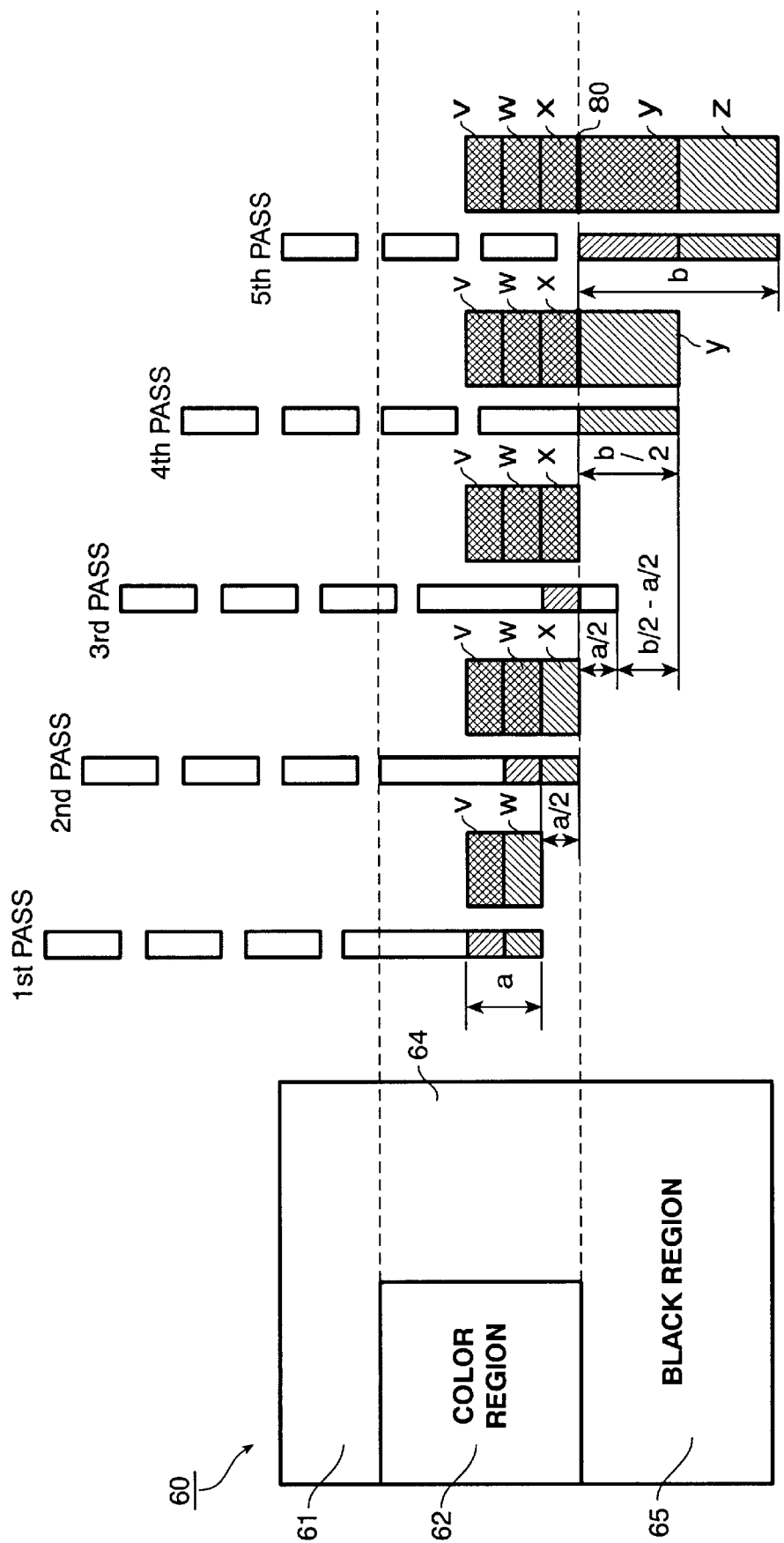
FIG. 19 illustrates banding resulting from printing of adjacent regions of a page using different nozzle configurations.

Accordingly, as shown in the first pass of FIG. 19, black pixel data of region 64 of document image 60 is printed during a first scan using a lower 23 black nozzles of print head 50. The upper half of the 23 nozzles print over a region previously printed, while the lower half print over a new region. Next, in a second pass, the region freshly printed during the first pass is overlapped and a next previously-unprinted region is printed.

As described with respect to FIG. 15, it is preferable to print black region 65 using 63 of the 64 black nozzles of print head 50. Accordingly, region x is overlapped during a third pass using approximately half of the nozzles previously used du ring the first pass and the second pass. Next, in a fourth pass, approximately half of the 63 nozzles are used to print region y so as to print a region which can be overlapped during subsequent printing passes.

Unfortunately, using the technique shown in FIG. 9, banding appears at boundary 80 between region x and region y, primarily because boundary 80 is not overlapped during printing. Moreover, region y and region z are printed during a fifth printing pass which serves to further darken the band at boundary 80 between x and region y.

Figure 20:
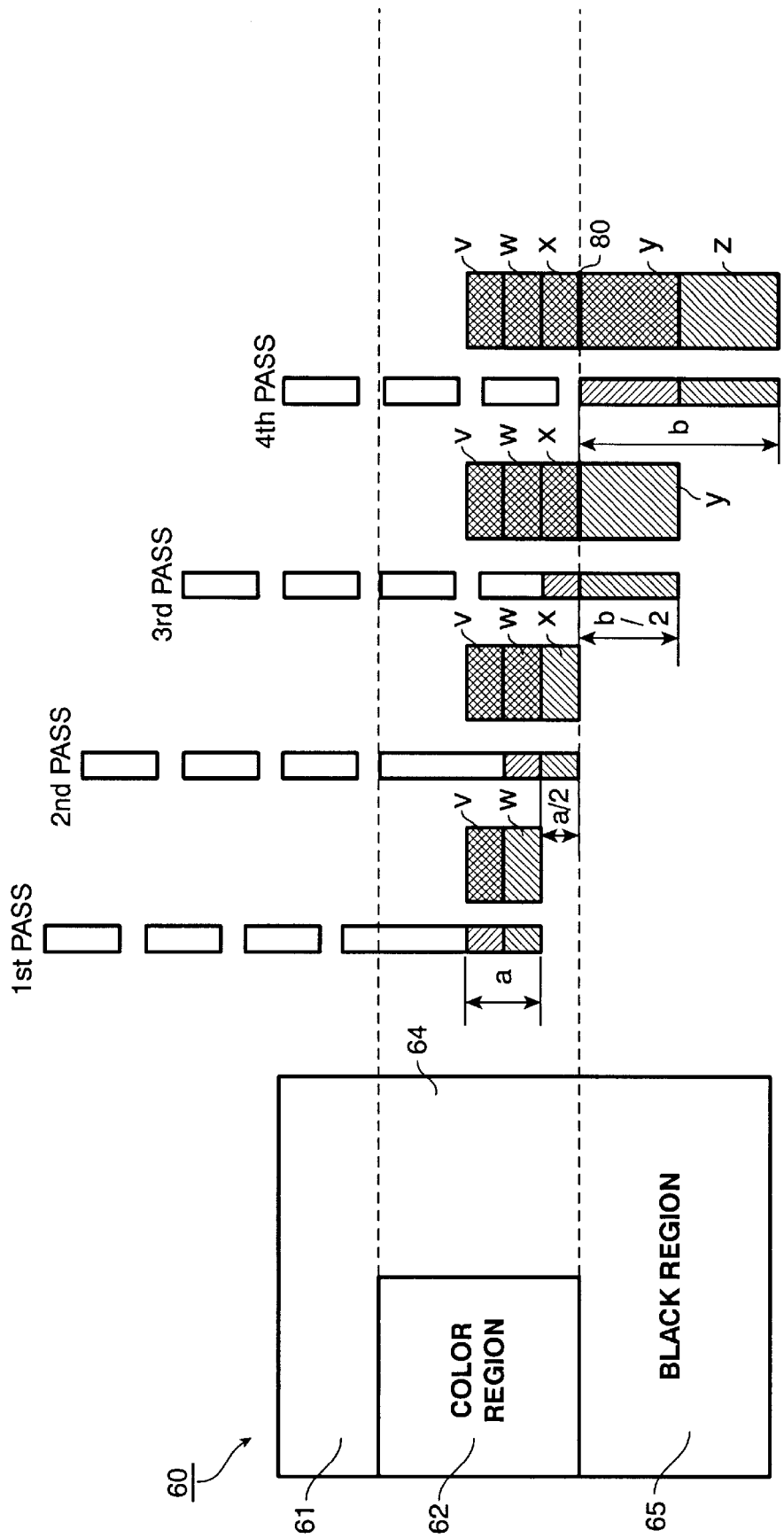
FIG. 20 illustrates a method for reducing banding between printed regions of a page printed using different nozzle configurations.

FIG. 20 illustrates a method to reduce banding between regions printed in accordance with FIG. 15. It should, however, be understood that the method illustrated in FIG. 20 may be applied to reduce banding in other printing situations as well. As shown in FIG. 20, the first and second printing passes proceed as shown and described with respect to FIG. 19. However, during a third pass, both region x and region y are printed thereby providing a printed region which overlaps boundary 80 between region x and region y. Next, a fourth pass is performed to overlap region y and to newly print within region z.

Figure 21:
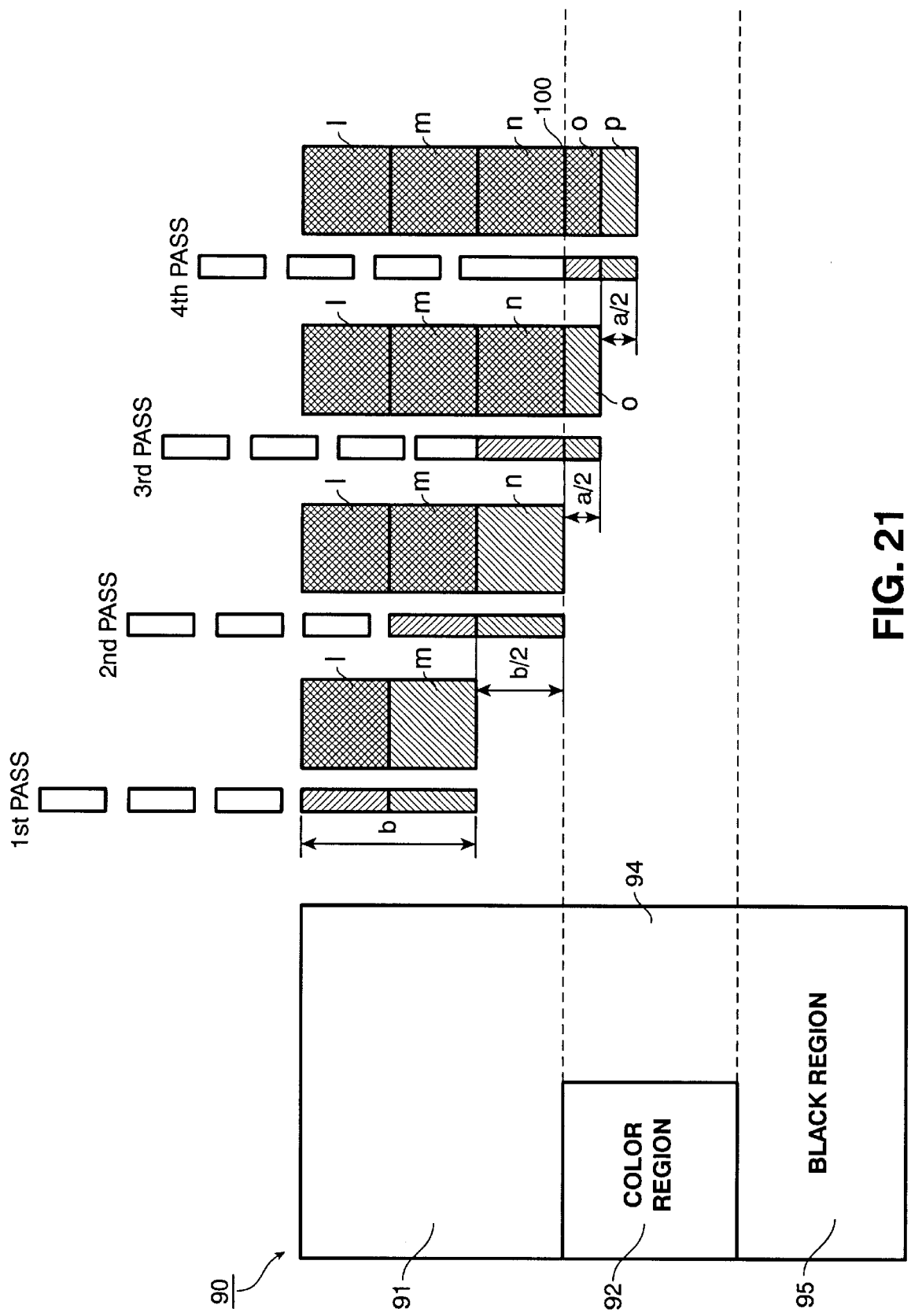
FIG. 21 illustrates a method for reducing banding between regions of a page printed using different nozzle configurations.

In contrast to FIG. 20, FIG. 21 illustrates a method to address banding at a boundary between a printed black region and a subsequently-printed color region. In this regard, document image 90 contains black regions 91 and 95, color region 92, and black pixels within region 94. In accordance with FIG. 15, it is desirable to print the black pixels within region 94 using a lower 23 black nozzles of print head 50. As shown in FIG. 21, multi-pass direct rasterization printing proceeds as described with respect to the first, second, and third embodiments during a first printing pass and a second printing pass. However, because a boundary is reached after the second printing pass, the third printing pass is printed using nozzles so as to overlap area and to print 23 rasters of area o. Accordingly, boundary 100 between area n and area o is overlapped during a single printing scan, thereby reducing banding at boundary 100. During a fourth printing pass, 23 nozzle printing proceeds along the lines described with respect to the first, second, and third embodiments.

Figure 22:
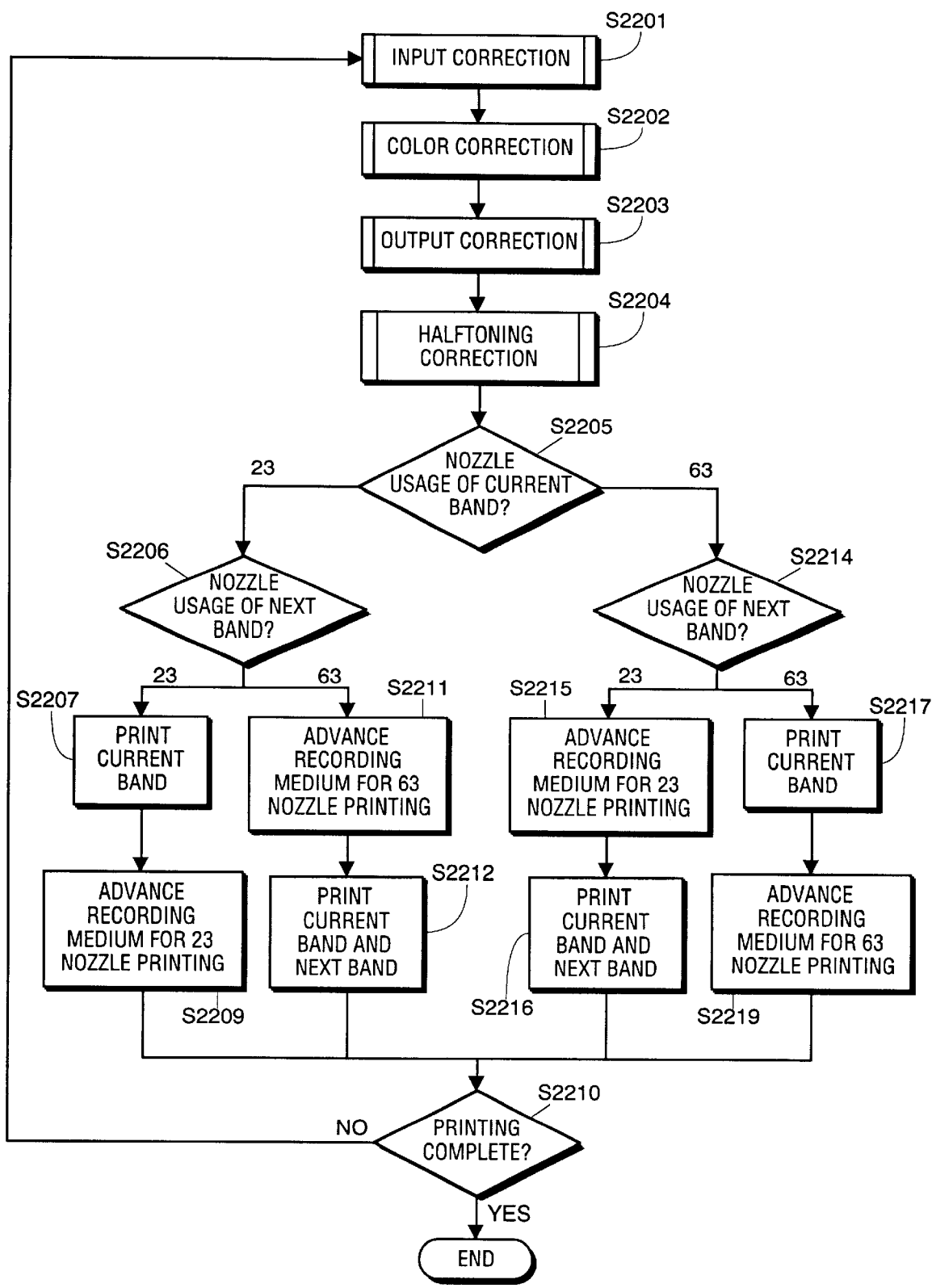
FIG. 22 is a flow diagram for describing process steps to print a page using a plurality of nozzle configurations according to the present invention.

FIG. 22 is a flow diagram for describing the process steps to reduce banding in the manner illustrated in FIGS. 20 and 21.

Briefly, according to the FIG. 22 process steps, it is determined whether a nozzle usage to print of a next region of raster data is different from a nozzle usage to print a first region of raster data, and the second raster data of the second set of rasters and third raster data of a third set of rasters of the next region are printed during the second printing pass in a case that it is determined that the nozzle usage to print the next region of raster data is different from the nozzle usage to print the first region of raster data.

In more detail, flow begins at step S2201 in which a band of multi-level pixel data is input and subjected to input correction. Preferably, input correction in step S2201 proceeds as described above with respect to step s604. Similarly, steps S2202, S2203 and S2204 proceed as described above with respect to steps S606, S607 and S609, respectively.

Next, in step S2205, the print head nozzle usage of the band of data input in step S2201 is determined. If 23 nozzles are required to print the band, flow proceeds to step S2206. In step s2206, the nozzle usage required by a band of data to be printed in a next printing pass is determined. If 23 nozzle printing is required for the next printing pass, flow proceeds to step S2207, wherein the current band is printed. This situation is illustrated by the first pass of FIG. 20. Next, in step S2209, the recording medium is advanced a distance appropriate for 23 nozzle printing, as shown by the second printing pass of FIG. 20. In a case that direct rasterization is performed as described above with respect to FIGS. 8, 11 and 13, the recording medium is advanced $23 \times \frac{1}{360}'' - \frac{1}{720}'' = 0.0625''$ in step S2209. Next, in step S2210, it is determined whether the entire page has been printed. If so, the process steps of FIG. 22 terminate. If not, flow returns to step S2201 for input of a next band of pixel data.

If, in step S2206, it is determined that 63 nozzles are required for use during a next printing pass, flow proceeds to step S2211. The second pass of FIG. 20 illustrates a printing situation prior to step S2211. In step S2211, the recording medium is advanced in a manner suitable for 63 nozzle printing. Next, in step S2212, the current band and the next band are printed in a single printing pass. The results of steps S2211 and S2212 are illustrated by the third pass shown in FIG. 20. Flow then proceeds to step S2210 as described above.

If, in step S2205, it is determined that 63 nozzles are required for printing the current band, flow proceeds to step S2214, wherein a required nozzle usage of a next band is determined. If 23 nozzles are required by a next band, flow continues to step S2215, wherein the recording medium is advanced in accordance with 23 nozzle printing, as described above with respect to step S2209. The second pass illustrated in FIG. 21 shows a situation in which the process steps of FIG. 22 have reached step S2215.

In step S2215, the current band and data of the next band are printed in a single printing pass. An example of such a printing pass is the third printing pass shown in FIG. 21. Flow continues from step S2216 to step S2210.

If, in step S2214, it is determined that 63 nozzles are required to print a next printing pass, flow proceeds to step S2217. In step S2217, the current band is printed using 63 printing nozzles. This situation is illustrated by the first pass shown in FIG. 21. Next, in step S2219, the recording medium is advanced a distance appropriate for 63 nozzle printing, 0.0625", and flow proceeds to step S2210.

By virtue of the foregoing process steps, banding at a boundary between regions printed using different nozzle configurations is reduced. It should be noted that the foregoing process steps may be used in conjunction with nozzle usages other than 23 and 63, including but not limited to 23 and 127, 24 and 64, or 24 and 128. Moreover, the FIG. 22 process steps may be used in conjunction with any method of multi-pass printing.

It should also be noted that the printing passes described above may occur in a bi-directional or in a unidirectional fashion. Moreover, the above process steps may be implemented using a dual head ink jet printer in which a portion of a printed raster is printed using a first head and a remaining portion of the raster is printed using a second print head. In addition, the present invention may be utilized in a system having nozzle resolution, variable droplet sizes and desired printing resolutions different from those described above.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for printing raster data on a recording medium using a plurality of ink jet nozzles, the method comprising:

(a) assigning first raster data of a first set of raster lines to the plurality of ink jet nozzles for printing during a first printing pass and second raster data of a second set of raster lines to the plurality of ink jet nozzles for printing during a second printing pass;

(b) printing the first raster data during the first printing pass;

(c) advancing the recording medium a particular distance;

(d) printing the second raster data during the second printing pass; and (e) advancing the recording medium the particular distance, wherein each raster line is printed in a single printing pass, at least one raster line from either of the first and second set of raster lines is disposed between raster lines of the other set and steps (a) to (e) are repeated in order to print a first region of raster data on the recording medium.

2. A method according to claim 1, further comprising performing ink limitation processing on the rasterized data to create ink-limited raster data.

3. A method according to claim 2, wherein the ink limitation processing is performed in accordance with a maximum absorbency of the recording medium and an ink droplet size.

4. A method according to claim 1, further comprising determining whether to print the first raster data during the first printing pass and the second raster data during the second printing pass using small or large ink droplets.

5. A method according to claim 4, wherein both small ink droplets and large ink droplets are printed on the recording medium.

6. A method according to claim 1, further comprising determining a required number of printing passes according to a nozzle resolution and a desired vertical output resolution.

7. A method according to claim 1, further comprising determining the particular distance based on a number of nozzles used during the first printing pass, a nozzle resolution of the nozzles used during the first printing pass, and a desired output resolution.

8. A method according to claim 1, further comprising:

determining whether a nozzle usage to print of a next region of raster data is different from a nozzle usage to print the first region of raster data; and printing the second raster data of the second set of rasters and third raster data of a third set of rasters of the next region during the second printing pass in a case that it is determined that the nozzle usage to print the next region of raster data is different from the nozzle usage to print the first region of raster data.

9. A computer-readable medium storing computer-executable process steps to print raster data on a recording medium using a plurality of ink jet nozzles, the steps comprising:

(a) an assigning step to assign first raster data of a first set of raster lines to the plurality of ink jet nozzles for printing during a first printing pass and second raster data of a second set of raster lines to the plurality of ink jet nozzles for printing during a second printing pass;

(b) a printing step to print the first raster data during the first printing pass;

(c) an advancing step to advance the recording medium a particular distance;

(d) a printing step to print the second raster data during the second printing pass; and (e) an advancing step to advance the recording medium the particular distance, wherein each raster line is printed in a single printing pass, at least one raster line from either of the first and second set of raster lines is disposed between raster lines of the other set and steps (a) to (e) are repeated in order to print a first region of raster data on the recording medium.

10. A computer-readable medium according to claim 9, wherein the process steps further comprise a performing step to perform ink limitation processing on the rasterized data to create ink-limited raster data.

11. A computer-readable medium according to claim 10, wherein the ink limitation processing is performed in accordance with a maximum absorbency of the recording medium and an ink droplet size.

12. A computer-readable medium according to claim 9, wherein the process steps further comprise a determining step to determine whether to print the first raster data during the first printing pass and the second raster data during the second printing pass using small or large ink droplets.

13. A computer-readable medium according to claim 12, wherein both small ink droplets and large ink droplets are printed on the recording medium.

14. A computer-readable medium according to claim 9, wherein the process steps further comprise a determining step to determine a required number of printing passes according to a nozzle resolution and a desired vertical output resolution.

15. A computer-readable medium according to claim 9, wherein the process steps further comprise a determining step to determine the particular distance based on a number of nozzles used during the first printing pass, a nozzle resolution of the nozzles used during the first printing pass, and a desired output resolution.

16. A computer-readable medium according to claim 9, further comprising:

a determining step to determine whether a nozzle usage to print of a next region of raster data is different from a nozzle usage to print the first region of raster data; and a printing step to print the second raster data of the second set of rasters and third raster data of a third set of rasters of the next region during the second printing pass in a case that it is determined that the nozzle usage to print the next region of raster data is different from the nozzle usage to print the first region of raster data.

17. A printer comprising:

printing means to print raster data on a recording medium using a plurality of ink jet nozzles, said printing means capable of selectably printing large or small ink droplets;

line feed means to advance a recording medium; and a controller for executing stored computer-executable process steps 1) to assign first raster data of a first set of raster lines to the plurality of ink jet nozzles for printing during a first printing pass and second raster data of a second set of raster lines to the plurality of ink jet nozzles for printing during a second printing pass, 2) to print the first raster data during the first printing pass, 3) to advance the recording medium a particular distance, 4) to print the second raster data during the second printing pass, and 5) to advance the recording medium the particular distance, wherein each raster line is printed in a single printing pass, at least one raster line from either of the first and second set of raster lines is disposed between raster lines of the other set and steps 1) to 5) are repeated in order to print a first region of raster data on the recording medium.

18. A printer according to claim 17, wherein the process steps executed by the controller further comprise a performing step to perform ink limitation processing on the rasterized data to create ink-limited raster data.

19. A printer according to claim 18, wherein the ink limitation processing is performed in accordance with a maximum absorbency of the recording medium and an ink droplet size.

20. A printer according to claim 17, wherein the process steps executed by the controller further comprise a determining step to determine whether to print the first raster data during the first printing pass and the second raster data during the second printing pass using small or large ink droplets.

21. A printer according to claim 20, wherein both small ink droplets and large ink droplets are printed on the recording medium.

22. A printer according to claim 17, wherein the process steps executed by the controller further comprise a determining step to determine a required number of printing passes according to a nozzle resolution and a desired vertical output resolution.

23. A printer according to claim 17, wherein the process steps executed by the controller further comprise a determining step to determine the particular distance based on a number of nozzles used during the first printing pass, a nozzle resolution of the nozzles used during the first printing pass, and a desired output resolution.

24. A printer according to claim 17, wherein the process steps executed by the controller further comprise:

a determining step to determine whether a nozzle usage to print of a next region of raster data is different from a nozzle usage to print the first region of raster data; and a printing step to print the second raster data of the second set of rasters and third raster data of a third set of rasters of the next region during the second printing pass in a case that it is determined that the nozzle usage to print the next region of raster data is different from the nozzle usage to print the first region of raster data.

* * * * *

UNITED STATES PATENT AND TRADEMARK OFFICE
CERTIFICATE OF CORRECTION

PATENT NO. : 6,290,328 B1  Page 1 of 1
DATED : September 18, 2001
INVENTOR(S) : Akitoshi Yamada et al.

It is certified that error appears in the above-identified patent and that said Letters Patent is hereby corrected as shown below:

Column 2,
Line 46, "print of" should read -- print --.

Column 8,
Line 11, "inch X 1/260" should read -- inch X 1/360 --.
Line 26, "present" should read -- prevent --.

Column 12,
Line 49, "S111" should read -- S1111 --.

Column 18,
Line 13, "du ring" should read -- during --.

Column 19,
Line 1, "s604." should read -- S604. --.
Line 7, "s2206," should read -- S2206, --.

Column 21,
Line 57, "print of" should read -- print --.

Column 22,
Line 56, "print of" should read -- print --.

Signed and Sealed this

Ninth Day of April, 2002

Attest:

JAMES E. ROGAN
Attesting Officer  Director of the United States Patent and Trademark Office